(12) United States Patent
Fan et al.

(10) Patent No.: US 11,816,049 B2
(45) Date of Patent: Nov. 14, 2023

(54) INTERRUPT REQUEST SIGNAL CONVERSION SYSTEM AND METHOD, AND COMPUTING DEVICE

(71) Applicant: Phytium Technology Co., Ltd., Tianjin (CN)

(72) Inventors: Lizheng Fan, Tianjin (CN); Cai Chen, Tianjin (CN); Fudong Liu, Tianjin (CN); Xiaofan Zhao, Tianjin (CN)

(73) Assignee: PHYTIUM TECHNOLOGY CO., LTD., Tianjin (CN)

( * ) Notice: Subject to any disclaimer, the term of this patent is extended or adjusted under 35 U.S.C. 154(b) by 29 days.

(21) Appl. No.: 17/575,543

(22) Filed: Jan. 13, 2022

(65) Prior Publication Data

US 2022/0229794 A1 Jul. 21, 2022

(30) Foreign Application Priority Data

Jan. 15, 2021 (CN) .......................... 202110053411.7

(51) Int. Cl.
*G06F 13/24* (2006.01)

(52) U.S. Cl.
CPC .......... *G06F 13/24* (2013.01); *G06F 2213/24* (2013.01)

(58) Field of Classification Search
CPC ......... G06F 13/24; G06F 13/38; G06F 13/382
See application file for complete search history.

(56) References Cited

U.S. PATENT DOCUMENTS

| | | | | |
|---|---|---|---|---|
| 5,619,703 A | * | 4/1997 | Omid | G06F 13/24 710/261 |
| 5,752,043 A | * | 5/1998 | Suzuki | G06F 13/24 710/264 |
| 5,848,278 A | * | 12/1998 | Sakai | G06F 13/24 713/400 |
| 5,940,402 A | * | 8/1999 | Krakovyak | G06F 13/24 370/461 |
| 6,115,780 A | * | 9/2000 | Furuta | G06F 13/24 710/266 |
| 2003/0212844 A1 | * | 11/2003 | Wang | G06F 13/24 710/266 |

(Continued)

FOREIGN PATENT DOCUMENTS

| | | |
|---|---|---|
| CN | 1283286 A | 2/2001 |
| CN | 102768648 A | 11/2012 |
| CN | 103077137 A | 5/2013 |

(Continued)

*Primary Examiner* — Phong H Dang
(74) *Attorney, Agent, or Firm* — ANOVA LAW GROUP, PLLC

(57) ABSTRACT

An interrupt request signal conversion system includes an interrupt request signal converter configured to generate one or more converted interrupt request signals based on one or more signals received from one or more peripheral devices, and a signal output terminal configured to send the one or more converted interrupt request signals to an interface module of a processor during operation. Each of the one or more converted interrupt request signals includes a plurality of interrupt identification bits each used to identify, based on a first level and a second level different from the first level, whether a signal received from a corresponding one of the one or more peripheral devices within a predetermined time range includes a peripheral interrupt request signal.

19 Claims, 21 Drawing Sheets

(56) References Cited

U.S. PATENT DOCUMENTS

2012/0284442 A1\* 11/2012 Card ................... G06F 13/24
                                                             710/260
2013/0185469 A1\* 7/2013 Motai ................... G06F 13/26
                                                             710/267

FOREIGN PATENT DOCUMENTS

| CN | 107544838 A | 1/2018 |
| CN | 108369564 A | 8/2018 |

\* cited by examiner

INTERRUPT REQUEST SIGNAL CONVERSION SYSTEM AND METHOD, AND COMPUTING DEVICE

CROSS-REFERENCE TO RELATED APPLICATION

This application claims priority to Chinese Application No. 202110053411.7, filed on Jan. 15, 2021, the entire content of which is incorporated herein by reference.

TECHNICAL FIELD

The present disclosure relates to the technical field of interrupt technology and, more specifically, to an interrupt request signal conversion system and method, and a computing device.

BACKGROUND

Computer interruption refers to that: when an abnormal situation or special request that occurs in the system while the computer is executing a program, the computer temporarily interrupts the program currently being executed and handles the abnormal situation or special request, and returns to the original interruption point to continue to execute the program after the abnormal situation or special request is handled.

When some peripheral devices (e.g., PO devices) exchange information with a host, due to the low working speed of the peripheral devices, while the peripheral devices are preparing, rather than waiting, the central processing unit (CPU) will continue to execute the current program until the peripheral devices are ready and sends an interrupt request to the CPU, at which time the CPU temporarily interrupts the current program and switches to the peripheral device service program.

SUMMARY

In accordance with the disclosure, there is provided an interrupt request signal conversion system including an interrupt request signal converter configured to generate one or more converted interrupt request signals based on one or more signals received from one or more peripheral devices, and a signal output terminal configured to send the one or more converted interrupt request signals to an interface module of a processor during operation. Each of the one or more converted interrupt request signals includes a plurality of interrupt identification bits each used to identify, based on a first level and a second level different from the first level, whether a signal received from a corresponding one of the one or more peripheral devices within a predetermined time range includes a peripheral interrupt request signal.

Also in accordance with the disclosure, there is provided a computing device including a processor and an interrupt request signal conversion system. The processor includes an interface module and an interrupt controller. The interrupt request signal conversion system includes an interrupt request signal converter configured to generate one or more converted interrupt request signals based on one or more signals received from one or more peripheral devices, and a signal output terminal configured to send the one or more converted interrupt request signals to the interface module of the processor during operation. Each of the one or more converted interrupt request signals includes a plurality of interrupt identification bits each used to identify, based on a first level and a second level different from the first level, whether a signal received from a corresponding one of the one or more peripheral devices within a predetermined time range includes a peripheral interrupt request signal. The interface module includes an interface controller configured to report an interrupt request of the peripheral device requesting interrupt to the interrupt controller based on the one or more converted interrupt request signals.

Also in accordance with the disclosure, there is provided an interrupt request signal conversion method including generating one or more converted interrupt request signals based on one or more signals received from one or more peripheral devices, and sending the one or more converted interrupt request signals to an interface module of a processor during operation. Each of the converted interrupt request signals includes a plurality of interrupt identification bits, each of the one or more converted interrupt request signals including a plurality of interrupt identification bits each used to identify, based on a first level and a second level different from the first level, whether a signal received from a corresponding one of the one or more peripheral devices within a predetermined time range includes a peripheral interrupt request signal.

BRIEF DESCRIPTION OF THE DRAWINGS

To more clearly illustrate the technical solutions in the embodiments of the present disclosure, the drawings used in the description of the embodiments will be briefly described below. It is obvious that the drawings in the following description are only some embodiments of the present disclosure. For those having ordinary skills in the art, other drawings can be obtained according to these drawings without inventive efforts.

DETAILED DESCRIPTION OF THE EMBODIMENTS

Technical solutions in the embodiments of the present disclosure are described in more detail in the following with reference to the accompanying drawings in the embodiments of the present disclosure. It is obvious that the described embodiments are only a part of the embodiments of the present disclosure, but not all embodiments. On the basis of the embodiments of the present disclosure, all other embodiments conceived without inventive efforts by those having ordinary skills in the art are within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to be limited to a physical connection or mechanical connection, but may include an electrical connection, directly or indirectly. "Up," "down," "right," "left" and the like are only used to indicate relative position relationship, and when the position of the object which is described is changed, the relative position relationship may be changed accordingly.

A processor may include an interface module and an interrupt controller. The interface module may be configured to receive a peripheral interrupt request signal sent by a peripheral device, and report the interrupt request of the peripheral device to the interrupt controller based on the received peripheral interrupt request signal. In some cases, the interrupt request signal sent by some peripheral devices may not match the interface module of the processor, which makes the processor unable to respond to the interrupt request sent by some peripheral devices, and therefore restricts the types of peripheral devices suitable for the interface module. An example is provided below in conjunction with FIG. 1 and FIGS. 2A-2C.

Figure 1:
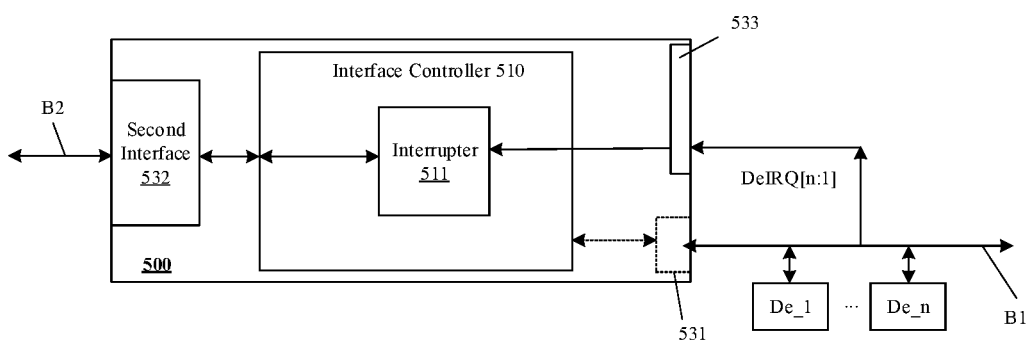
FIG. 1 is a schematic block diagram of an interface module of a processor.

FIG. 1 is a schematic block diagram of an interface module 500 of a processor. As shown in FIG. 1, the interface module 500 includes an interface controller 510, a first interface 531, a second interface 532, and a third interface 533.

As shown in FIG. 1, the first interface 531 of the interface module 500 is coupled to a plurality of peripheral devices (De_1-De_n) via a first bus B1, and the second interface 532 of the interface module 500 is coupled to a processor core via a second bus B2. The processor core may be configured to access a target peripheral device that requests access via the second interface 532, the interface controller 510, and the first interface 531 based on an address occupied by the target peripheral device.

The third interface 533 of the interface module 500 may be configured to receive a peripheral interrupt request signal sent by a peripheral device. For example, as shown in FIG. 1, the peripheral interrupt request signal DeIRQ[n:1] received by the third interface 533 may include a peripheral interrupt request signal DeIRQ[1] sent by a first peripheral device De_1, a peripheral interrupt request signal DeIRQ[2] sent by a second peripheral device De_2, . . . , and a peripheral interrupt request signal DeIRQ[n] sent by the nth peripheral device De_n.

As shown in FIG. 1, the interface controller 510 includes an interrupter 511. The interrupter 511 may be configured to receive a peripheral interrupt request signal via the third interface 533. For example, as shown in FIG. 1, the interrupter 511 may be configured to determine the peripheral device requesting an interrupt based on the received peripheral interrupt request signal, and report the interrupt request of the peripheral device requesting the interrupt to the interrupt controller of the processor via the second bus B2.

In some embodiments, the peripheral interrupt request signal that can be identified by the interface controller 510 may satisfy predetermined requirements, which will be described below in conjunction with FIG. 2A and FIG. 2B.

Figure 2A:
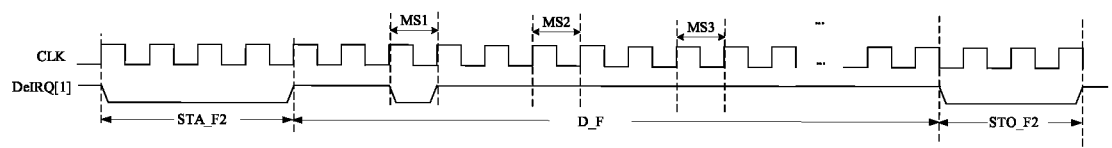
FIG. 2A and FIG. 2B are schematic diagrams showing interrupt request signals that are identifiable by an interface controller shown in FIG. 1.
Figure 2B:
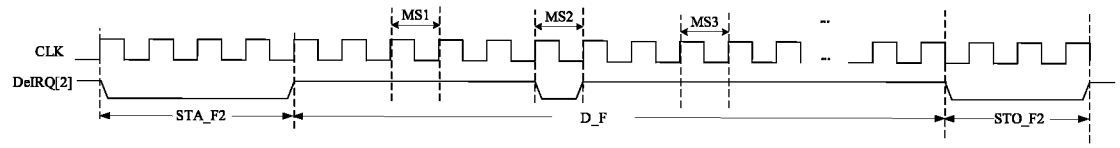

FIG. 2A and FIG. 2B show the peripheral interrupt request signal DeIRQ[1] sent by the first peripheral device De_1 and the peripheral interrupt request signal DeIRQ[2] sent by the second peripheral device De_2 shown in FIG. 1, respectively. For the convenience of description, FIG. 2A and FIG. 2B also show a clock signal CLK of the interface module 500. In some embodiments, the interface controller 510 may identify the peripheral interrupt request signals shown in FIG. 2A and FIG. 2B.

As shown in FIG. 2A and FIG. 2B, the peripheral interrupt request signal DeIRQ[1] and the peripheral interrupt request signal DeIRQ[2] each include a start frame STA_F, an end frame STO_F, and a data frame D_F between the start frame STA_F and the end frame STO_F. The data frame D_F includes a plurality of interrupt identification bits (e.g., the interrupt identification bit MS1 to the interrupt identification bit MSn, which are later denoted as MS1-MSn, FIG. 2A and FIG. 2B only show the first three interrupt identification bits). The plurality of interrupt identification bits MS1-MSn may respectively correspond to the plurality of peripheral devices coupled to the first bus B1 (e.g., peripheral devices De_1 to peripheral device De_n). The j-th interrupt identification bit MSj of the plurality of interrupt identification bits MS1-MSn may use a first level to identify the j-th peripheral device De_j corresponding to the j-th interrupt identification bit MSj has sent by an interrupt request within a predetermined time range. The j-th interrupt identification bit may use a second level different from the first level to identify that the j-th peripheral device De_j has not sent the interrupt request within the predetermined time range, where j may be a positive integer less than or equal to the number of interrupt identification bits MS1-MSn. In some embodiments, the first level (e.g., a low level) may be lower than a second level (e.g., a high level).

In some embodiments, the interrupter 511 may determine the serial number of the interrupt identification bit of the first level in the peripheral interrupt request signal and the peripheral device that requests the interrupt identified by the interrupt identification bit of the first level based on the number of clock cycles between the interrupt identification bit of the first level and the start frame STA_F, and report the interrupt request of the peripheral device requesting the interrupt to the interrupt controller of the processor via the second bus B2 after receiving the end frame STO_F of the peripheral interrupt request signal.

Figure 2C:
FIG. 2C is a schematic diagram showing an interrupt request signal that is not identifiable by the interface controller shown in FIG. 1.

FIG. 2C is a schematic diagram showing an interrupt request signal DEIRQ2 that is not identified by the interface controller 510 shown in FIG. 1. For example, the peripheral interrupt request signal DeIRQ2 in FIG. 2C may use the first level to indicate that the peripheral device that sent the peripheral interrupt request signal requests an interrupt. When the peripheral device does not request an interrupt, the level of the signal output by the peripheral device may be the second level. In some cases, since the interface controller 510 shown in FIG. 1 cannot determine which device sent the peripheral interrupt request signal DeIRQ2 in FIG. 2C, the interface controller 510 shown in FIG. 1 cannot report the interrupt request of the peripheral device that sent the peripheral interrupt request signal in FIG. 2C to the interrupt controller of the processor. As a result, the types of the peripheral device applicable to the interface module 500 shown in FIG. 1 are limited.

Further, in some cases, even if the peripheral interrupt request signals sent by the plurality of peripheral devices (e.g., peripheral device De_1 to peripheral device De_n) coupled to the first bus B1 can be received and reported by the interface controller 510, the interface controller 510 may have a slower processing speed for the peripheral interrupt request signals sent by the plurality of peripheral devices (e.g., peripheral device De_1 to peripheral device De_n). This is because the peripheral interrupt request signals occupy a large number of clock cycles, and the interface controller 510 needs to report the interrupt requests related to the peripheral interrupt request signals after the clock cycles occupied by the peripheral interrupt request signals end.

The present disclosure provides an interrupt request signal conversion system and method, and a computing device. The interrupt request signal conversion system may include an interrupt request signal converter and a signal output terminal. The interrupt request signal converter may be configured to generate at least one converted interrupt request signal (e.g., a serial interrupt request signal) based on a signal received from at least one peripheral device. The signal output terminal may be configured to provide at least one converted interrupt request signal to the interface module of the processor during operation. Each converted interrupt request signal may include a plurality of interrupt identification bits. Each interrupt identification bit of the plurality of interrupt identification bits may determine whether the signal received from the peripheral device corresponding to each interrupt identification bit includes a peripheral interrupt request signal within a predetermined time range.

In some embodiments, the interrupt request signal conversion system may be coupled to an interface module of the processor, and generate at least one converted interrupt request signal that can be identified by the interface module based on a signal received from at least one peripheral device. As a result, the types of peripheral devices suitable for the interface module of the processor can be expanded. For example, the interrupt request signal conversion system may convert an interrupt message that does not meet the requirements of the interface module of the processor into an interrupt message that meets the requirements of the interface module of the processor, thereby expanding the types of peripheral devices suitable for the interface module of the processor.

In some embodiments, the interrupt request signal conversion system may combine interrupt messages of different peripheral devices by forming a converted interrupt request signal with a plurality of interrupt identification bits (i.e., the interrupt identification bits of the first level). In this way, the processing speed of the interrupt request of the peripheral device of the interface module of the processor that receives the converted interrupt request signal can be increased. For example, by combining interrupt messages of different peripheral devices, the upper limit of the number of interrupt messages sent by the peripheral device that can be carried by the interface module per unit time can also be increased.

In some embodiments, the interrupt request signal conversion system may include a plurality of interrupt request signal input terminals, and the types of peripheral interrupt request signals received by the plurality of interrupt request signal input terminals may be more than one. Therefore, the interrupt request signal conversion system can send the peripheral interrupt request signal to the interface module of the processor after combining the interrupt requests of different types of peripheral devices that send different types of peripheral interrupt request signals into the same converted interrupt request signal. In this way, the usability of the interface module of the processor can be improved while increasing the processing speed of the interface module to the interrupt request of the peripheral device.

In some embodiments, the interrupt request signal conversion system may be implemented as hardware such as a complex programmable logic device (CPLD) and a filed programmable gate array (FPGA). In this way, the time delay caused by the forwarding of the interrupt request can be avoided, thereby enabling the processor to respond to the interrupt request sent by the peripheral device in a timely manner.

The interrupt request signal conversion system provided in the embodiments of the present disclosure will be described below through various non-limiting examples and embodiments. As described below, if there is no conflict, different features in these specific examples and embodiments can be combined with each other to obtain new examples and embodiments, and these new examples and embodiments also belong to the scope of protection of the present disclosure.

Figure 3:
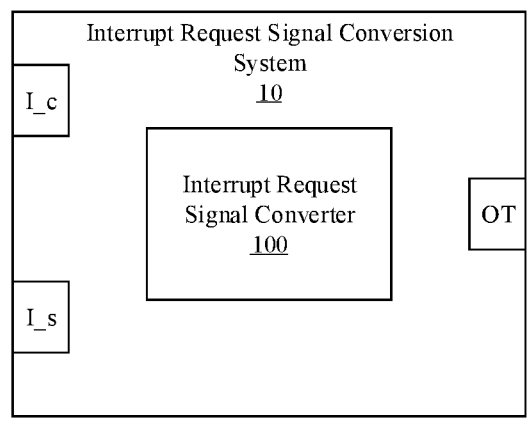
FIG. 3 is a schematic block diagram of an interrupt request signal conversion system according to an embodiment of the present disclosure.
Figure 4A:
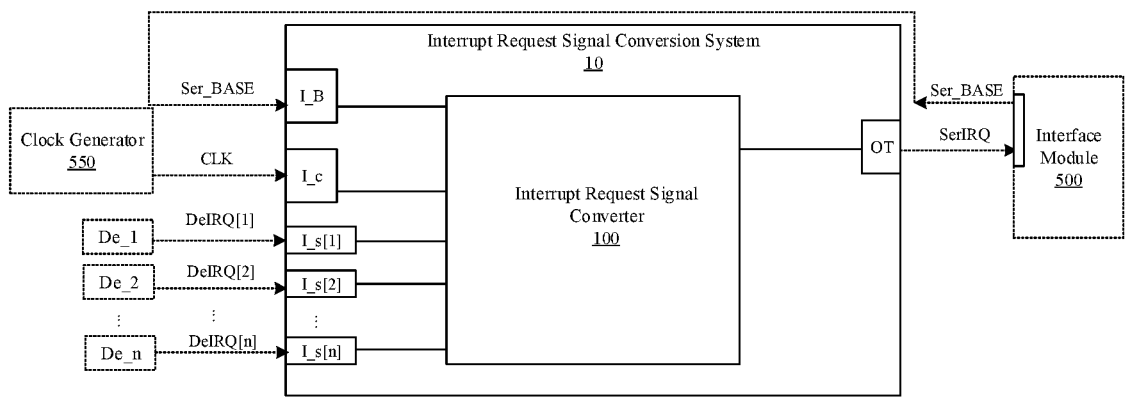
FIG. 4A and FIG. 4B are schematic block diagrams showing a first example and a second example of the interrupt request signal conversion system shown in FIG. 3.
Figure 4B:
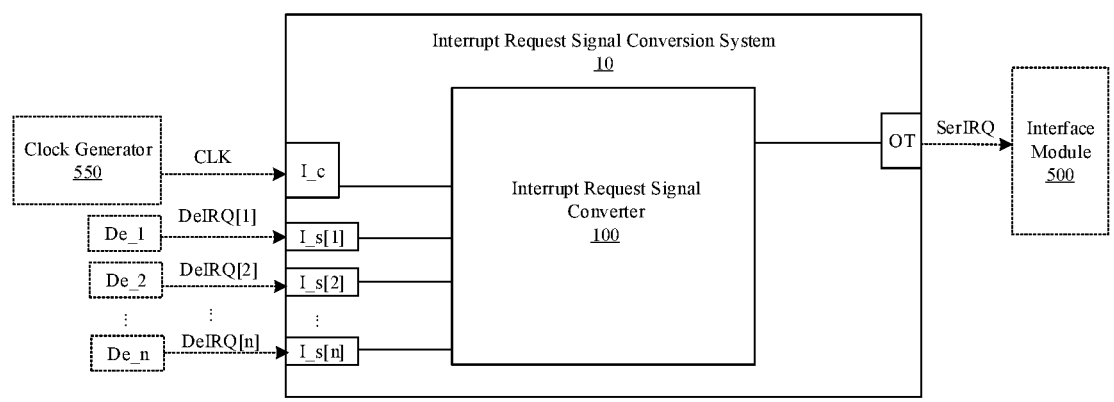

FIG. 3 is a schematic block diagram of an interrupt request signal conversion system 10 according to an embodiment of the present disclosure. FIG. 4A and FIG. 4B are a first example (e.g., an example of operating in a continuous mode) and a second example (e.g., an example of operating in a non-continuous mode or a static mode) of the interrupt request signal conversion system 10 shown in FIG. 3. For the convenience of description, FIG. 4A and FIG. 4B also show the peripheral devices (e.g., De_1 to De_n), the interface module 500 of the processor, and a clock generator 500 coupled to the interrupt request signal conversion system 10.

As shown in FIG. 3, FIG. 4A, and FIG. 4B, the interrupt request signal conversion system 10 includes an interrupt request signal converter 100 and a signal output terminal OT. The interrupt request signal converter 100 may be configured to generate at least one converted interrupt request signal SerIRQ based on a signal received from at least one peripheral device. The signal output terminal OT may be configured to send at least one converted interrupt request signal SerIRQ to the interface module 500 of the processor during operation.

For example, as shown in FIG. 3, FIG. 4A, and FIG. 4B, at least one interrupt request signal input terminal I_s is configured to receive a signal sent by at least one peripheral device during operation, and send the received signal to the interrupt request signal converter 100.

In some embodiments, the interrupt request signal conversion system 10 and the interface module 500 of the processor may support a plurality of peripheral devices (e.g., peripheral device De_1 to peripheral device De_n). For example, as shown in FIG. 4A and FIG. 4B, the interrupt request signal conversion system 10 may also include a plurality of interrupt request signal input terminals (e.g., I_s[1]-I_s[n]), and the plurality of interrupt request signal input terminals (e.g., I_s[1]-I_s[n]) may be configured to be respectively coupled to a plurality of (e.g., n) plurality of peripheral devices (e.g., peripheral device De_1 to peripheral device De_n).

In some embodiments, the number of interrupt request signal input terminal I_s included in the interrupt request signal conversion system 10 may be equal to the number of processors coupled to the interrupt request signal conversion system 10 and the number of peripheral devices (e.g., n) that the interrupt request signal conversion system 10 can support. In some embodiments, the n peripheral devices may be selected from a mouse, a keyboard, a serial port, or other applicable peripheral devices.

In some embodiments, as shown in FIG. 4A and FIG. 4B, the interrupt request signal conversion system 10 may also include a clock signal input terminal I_c. The clock signal input terminal I_c may be configured to receive the clock signal CLK and send the clock CLK to the interrupt request signal converter 100. The clock signal CLK may include a plurality of clock cycles. For example, as shown in FIG. 4A and FIG. 4B, the clock signal input terminal I_c is configured to be coupled to the clock generator 550. In some embodiments, the clock frequency of the interface module 500 may be 33 MHz.

Figure 5A:
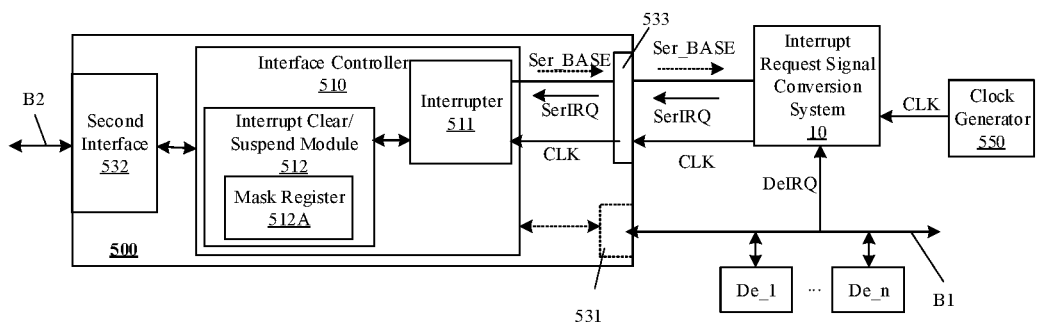
FIG. 5A and FIG. 5B are schematic diagrams showing an application example of the interrupt request signal conversion system shown in FIG. 3.
Figure 5B:
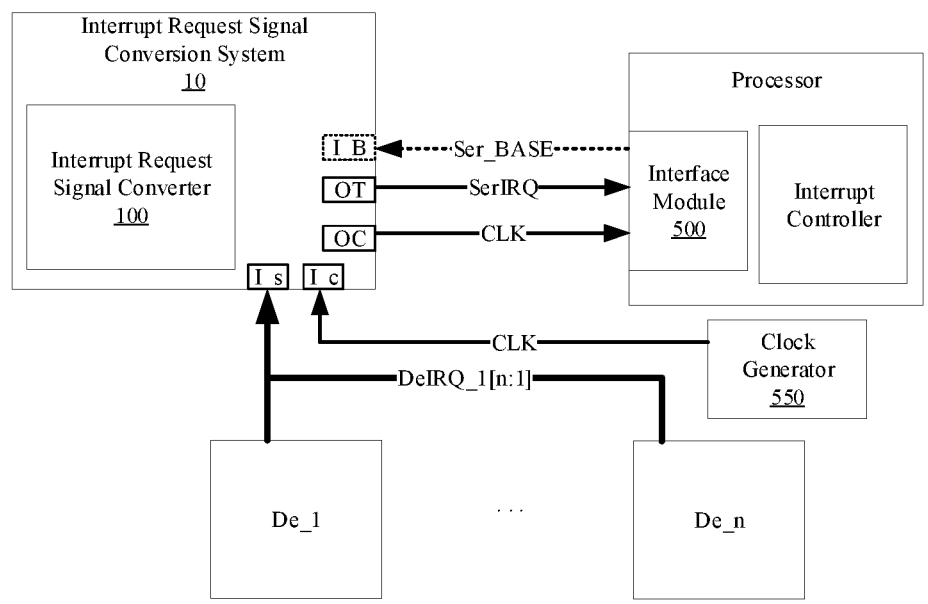

FIG. 5A and FIG. 5B are schematic diagrams showing an application example of the interrupt request signal conversion system 10 shown in FIG. 3. Compared with FIG. 4A and FIG. 4B, FIG. 5A and FIG. 5B are schematic diagrams showing the processor and the components included in the interface module 500 of the processor.

For example, as shown in FIG. 5A and FIG. 5B, the interface module 500 of the processor includes an interface controller 510, a first interface 531, a second interface 532, and a third interface 533. The first interface 531 is coupled to a plurality of peripheral devices (De_1-De_n) via the first bus B1, and the second interface 532 is coupled to the processor core with the second bus B2.

When the interface module 500 of the processor works in a read-write mode, the processor core may access the target peripheral device via the second interface 532, the interface controller 510, and the first interface 531 based on the address occupied by the target peripheral device that is requesting access. The third interface 533 may be coupled to the output terminal of the interrupt request signal conversion system 10 to receive the converted interrupt request signal SerIRQ from the interrupt request signal conversion system 10.

As shown in FIG. 5A and FIG. 5B, the interface controller 510 includes an interrupter 511. When the interface module 500 of the processor is working in an interrupt mode, the interrupter 511 may be configured to receive the converted interrupt request signal SerIRQ via the third interface 533, and determine the peripheral device requesting the interrupt based on the converted interrupt request signal SerIRQ. The interrupt request of the peripheral device requesting the interrupt may be reported to the interrupt controller of the processor via the second bus B2.

Figure 6A:
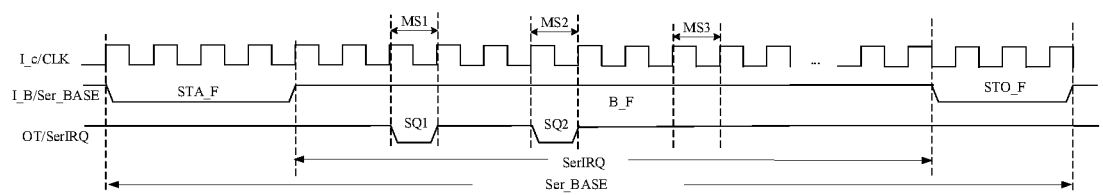
FIG. 6A and FIG. 6B are schematic diagrams showing converted interrupt request signals generated by interrupt request signal converters shown in FIG. 4A and FIG. 4B, respectively.
Figure 6B:
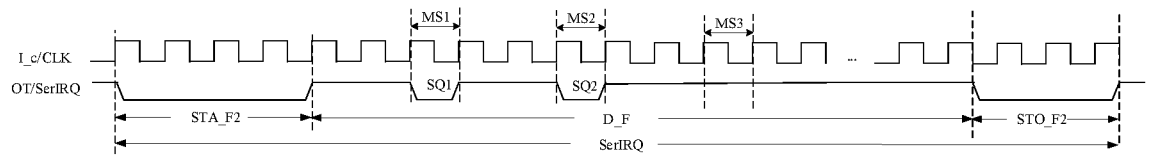

FIG. 6A and FIG. 6B are schematic diagrams showing the converted interrupt request signals SerIRQ generated by the interrupt request signal converter 100 shown in FIG. 4A and FIG. 4B, respectively. FIG. 6A and FIG. 6B also show the clock signal CLK received by the interrupt request signal conversion system 10.

As shown in FIG. 6A and FIG. 6B, each converted interrupt request signal SerIRQ includes a plurality of interrupt identification bits MS1-MSn. Each interrupt identification bit may be used to determine whether the signal received from the peripheral device corresponding to each interrupt identification bit includes a peripheral interrupt request signal within a predetermined time range based on the first level and the second level that is different from the first level.

It should be noted that FIG. 6A and FIG. 6B only show the first to the third interrupt identification bits MS1-MS3 of the plurality of interrupt identification bits MS1-MSn of the converted interrupt request signal SerIRQ. For the configuration method of other interrupt identification bits, reference can be made to the configuration methods of the first to the third interrupt identification bits MS1-MS3, which will not be repeated here.

The predetermined time range will be described later in conjunction with specific examples, which will be omitted here.

In some embodiments, the first level (e.g., a low level) may be lower than a second level (e.g., a high level). It should be noted that in the embodiments of the present disclosure, a low level and a high level are used to respectively represent the first level and the second level, but the embodiments of the present disclosure are not limited thereto, and a high level and a low level may also be used to represent the first level and the second level, respectively.

In some embodiments, the plurality of interrupt identification bits MS1-MSn may respectively correspond to a plurality of peripheral devices (e.g., peripheral device De_1-peripheral device De_n) that can be coupled to the interface module 500 and the interrupt request signal conversion system 10. In some embodiments, the plurality of interrupt identification bits MS1-MSn may correspond to the plurality of peripheral devices that can be coupled to the interface module 500 and the interrupt request signal conversion system 10 in a one-to-one correspondence.

For example, the j-th interrupt identification bit MSj of the plurality of interrupt identification bits MS1-MSn may use a first level to identify the j-th peripheral device De_j corresponding to the j-th interrupt identification bit MSj has sent by an interrupt request within a predetermined time range. Correspondingly, the signal received from the peripheral device corresponding to the j-th interrupt identification bit MSj within the predetermined time range may include the peripheral interrupt request signal. The j-th interrupt identification bit MSj may use the second level to identify that the j-th peripheral device De_j did not send an interrupt request within the predetermined time range. Correspondingly, within the predetermined time range, the signal received from the peripheral device corresponding to the j-th interrupt identification bit MSj may not include the peripheral interrupt request signal. In some embodiments, j may be a positive integer that is less than or equal to the number of the plurality of interrupt identification bits MS1-MSn. In some embodiments, the interrupt identification bit that is the first level may also be referred to as the interrupt request identifier.

For example, the plurality of interrupt identification bits MS1-MSn may correspond to a plurality of interrupt request signal input terminals I_s[1]-I_s[n]. Each interrupt identification bit may use the first level and the second level to respectively identify that the signal received by the peripheral device coupled to the interrupt request signal input terminal I_s corresponding to each interrupt identification bit includes and not include the peripheral interrupt request signal in the predetermined time range.

In some embodiments, the interrupt request signal converter 100 may be further configured to, in response to the signals received from the plurality of peripheral devices (e.g., peripheral device De_1-peripheral device De_n) including N peripheral interrupt request signals, cause at least one converted interrupt request signal SerIRQ to include N interrupt request identifiers (SQ1, SQ2, . . . , SQN) respectively corresponding to N peripheral interrupt request signals. Here, the N interrupt request identifiers (SQ1, SQ2, . . . , SQN) may be N interrupt identification bits of the first level, and N may be a positive integer.

In some embodiments, the number of interrupt request identifiers included in the at least one converted interrupt request signal SerIRQ may be greater than 1, such that fewer interrupt request signals SerIRQ can be used to transmit the interrupt requests sent by the plurality of peripheral devices (e.g., peripheral device De_1-peripheral device De_n). In this way, the processing speed of the interface module of the processor receiving the converted interrupt request signal SerIRQ to the interrupt request of the peripheral device can be increased, and the upper limit of the number of interrupt request signals sent by the peripheral device that the interface module can process per unit time can also be increased. For example, the N interrupt request identifiers (SQ1, SQ2, . . . , SQN) described above may be placed in the same converted interrupt request signal SerIRQ, and N may be greater than 1, thereby further increasing the processing speed of the interface module of the processor receiving the converted interrupt request signal SerIRQ to the interrupt request of the peripheral device, and the upper limit of the number of interrupt request signals sent by the peripheral device that the interface module can process in a time unit.

In some embodiments, the signals received from the plurality of peripheral devices (e.g., peripheral device De_1-peripheral device De_n) may include two peripheral interrupt request signals. Correspondingly, the converted interrupt request signal SerIRQ includes two interrupt request identifiers respectively corresponding to the two peripheral interrupt request signals. For example, the levels of the first and second interrupt identification bits MS1 and MS2 of the converted interrupt request signal SerIRQ shown in FIG. 6A and FIG. 6B are the first level, and the level of the third interrupt identification bit MS3 is the second level. This indicates that within the predetermined time range, the first and second peripheral devices De_1 and De_2 corresponding to the first and second interrupt identification bits MS1 and MS2 sent the interrupt requests, and the third peripheral device De_3 corresponding to the third interrupt identification bit MS3 did not send an interrupt request.

In the second example (that is, the interrupt request signal conversion system 10 shown in FIG. 4B), as shown in FIG. 6B, the converted interrupt request signal SerIRQ output by the output terminal OT of the interrupt request signal conversion system 10 shown in FIG. 4B includes a start frame STA_F2 (e.g., a start identification frame), a data frame D_F, and an end frame STO_F2 (e.g., an end identification frame). In terms of time, the start frame STA_F2 is positioned before the end frame STO_F2, and the data frame D_F is positioned between the start frame STA_F2 and the end frame STO_F2. The data frame D_F includes the plurality of interrupt identification bits MS1-MSn described above. In this case, the interface controller 510 of the interface module 500 of the processor may determine the interrupt requesting peripheral device identified by the interrupt identification bit (the interrupt identification bit of the first level) based on the number of clock cycles between the interrupt identification bit (the interrupt identification bit of the first level) in each converted interrupt request signal SerIRQ and the start frame STA_F2.

For example, in the first example (that is, the interrupt request signal conversion system 10 shown in FIG. 4A), as shown in FIG. 6B, the level corresponding to the start frame STA_F2 and the end frame STO_F2 is the first level. As shown in FIG. 6B, the level of the converted interrupt request signal SerIRQ other than the start frame STA_F2, the end frame STO_F2, and the interrupt request identifier corresponds to the second level.

For example, as shown in FIG. 6B, the start frame STA_F2 occupies the corresponding x_start clock cycles, and the end frame STO_F2 occupies a corresponding x_stop clock cycles. Each interrupt identification bit occupies a corresponding clock cycle, and the data frame D_F occupies a corresponding x_data clock cycle. Each converted interrupt request signal SerIRQ occupies a corresponding x_IRQ clock cycle. In some embodiments, x_start, x_stop, and x_data may all be positive integers, and x_IRQ=x_start+x_stop+x_data.

In some embodiments, the number of clock cycles x_data occupied by each data frame D_F, the number of clock cycles between the clock cycle occupied by the interrupt identification bit corresponding to each peripheral device and the start frame STA_F2 may be set based on the relevant protocol of the target interface module of the interrupt request signal conversion system 10 that can be coupled to the interrupt request signal conversion system 10 and the interface module 500.

In some embodiments, when the target interface module of the interrupt request signal conversion system 10 is the interface module 500, the interval between two adjacent first interrupt identifiers may be x_num clock cycles. In this case, for the interrupt request signal conversion system 10 that supports n peripheral devices, the number of clock cycle between the interrupt identification bit corresponding to the t-th (t may be a positive integer less than or equal to n) peripheral device and the start frame STA_F2 (the last clock cycle occupied by the start frame STA_F2) may be t*(x_num+1)−1, that is, the clock cycle occupied by the interrupt identification bit corresponding to the t-th peripheral device may be position at t*(x_num+1) clock cycles after the last clock cycle occupied by the start frame STA_F2.

For example, when the interface module 500 of the processor is a LPC interface module 500, x_start=4, x_stop=3, x_num=2 and n=16, the number of clock cycles between the interrupt identification bit corresponding to the t-th peripheral device and the start frame STA_F2 may be equal to t*3−1. In some embodiments, n may also be equal to 10, 29, 30 or other suitable numbers. In some embodiments, x_start may also be 8 or other suitable numbers, x_stop may also be 2 or other suitable numbers, and x_num may also be 4 or other suitable numbers.

In the first example, as shown in FIG. 4A, the interrupt request signal converter 100 also includes an interrupt reference level signal input terminal I_B. The interrupt request signal converter 100 may be further configured to receive at least one interrupt reference level signal respectively corresponding to at least one converted interrupt request signal SerIRQ from the interface module 500d via the interrupt reference level signal input terminal I_B, and using the at least one interrupt reference level signal Ser_BASE start frame STA_F and end frame STO_F2 to determine the start time and end time of the at least one converted interrupt request signal SerIRQ.

FIG. 6A also shows a schematic diagram of the interrupt reference level signal Ser_BASE received by the interrupt request signal conversion system 10 shown in FIG. 4A. In the first example, as shown in FIG. 6A, the interrupt reference level signal Ser_BASE includes a start frame STA_F, an end frame STO_F, and a blank frame B_F positioned between the start frame STA_F and the end frame STO_F. For example, the level corresponding to the blank frame B_F may be the second level. In some embodiments, the interrupt reference level signal Ser_BASE may also include an interval frame I_F (see FIG. 9) positioned after the end frame STO_F, and the level of the interval frame I_F may be the second level.

For example, as shown in FIG. 6A, the start time of each converted interrupt request signal SerIRQ is the end time of the start frame STA_F of the corresponding interrupt reference level signal Ser_BASE (that is, the start time of the blank frame B_F). Correspondingly, the converted interrupt request signal may be generated after detecting the start frame STA_F of the corresponding interrupt reference level signal Ser_BASE. The end time of each converted interrupt request signal SerIRQ is the start time of the end frame STO_F of the corresponding interrupt reference level signal Ser_BASE (that is, the end time of the blank frame B_F). In the first example, as shown in FIG. 6A, the number of clock cycles occupied by the blank frame B_F of the interrupt reference level signal Ser_BASE is equal to the number of clock cycles occupied by the converted interrupt request signal SerIRQ.

For example, in the first example, as shown in FIG. 6A, the interrupt request signal of the converted interrupt request signal SerIRQ does not include the start frame and the end frame. In this case, the interface controller 510 of the interface module 500 of the processor may determine the start time and end time of the converted interrupt request signal SerIRQ based on the start frame STA_F and the end frame STO_F of the interrupt reference level signal Ser_BASE sent by the interface module 500. In this way, the peripheral device that requests the interrupt identified by the interrupt identification bit of the first level may be determined based on the number of clock cycles between the interrupt identification bit of the first level in the converted interrupt request signal SerIRQ and the start frame STA_F of the interrupt reference level signal Ser_BASE.

In some embodiments, the characteristics of the converted interrupt request signal SerIRQ shown in FIG. 6A may be the same as or similar to the characteristics of the data frame D_F of the converted interrupt request signal SerIRQ shown in FIG. 6B. The characteristics of the start frame STA_F and the end frame STO_F of the interrupt reference level signal Ser_BASE shown in FIG. 6A may be the same as or similar to the characteristic of the start frame STA_F2 and the end frame STO_F2 of the converted interrupt request signal SerIRQ shown in FIG. 6B. Therefore, for more information about the converted interrupt request signal SerIRQ and the interrupt reference level signal Ser_BASE shown in FIG. 6A, reference can be made to the description of the data frame D_F of the converted interrupt request signal SerIRQ shown in FIG. 6B, which will not be repeated here.

In some embodiments, the interrupt request signal converter 100 may be configured to detect the peripheral interrupt request signal (that is, to detect whether the signal received from the interrupt request signal input terminal includes the peripheral interrupt request signal). The specific method for the interrupt request signal converter 100 to detect the peripheral interrupt request signal may be set based on the peripheral interrupt request signal sent by the target peripheral device of the interrupt request signal conversion system. For example, the peripheral interrupt request signal sent by the target peripheral device may be a signal that uses a single low level to represent the interrupt request, and the peripheral interrupt request signal sent by the target peripheral device may be detected by detecting the leading edge (e.g., the falling edge) of the peripheral interrupt request signal. By detecting the leading edge of the peripheral interrupt request signal to determine whether the target peripheral device sends the peripheral interrupt request signal, a more timely response to the interrupt request sent by the peripheral device may be achieved. In some embodiments, the single low level sent by the target peripheral device may be sampled multiple times to improve the accuracy of the detection result.

It should be noted that in the embodiments of the present disclosure, the leading edge (e.g., the falling edge) of the received (e.g., detected) peripheral interrupt request signal may also be used as a sign of the received (e.g., detected) peripheral interrupt request signal.

In some embodiments, the detection result of the peripheral interrupt request signal may be saved in a register. For example, if a falling edge is detected, the corresponding data bit in the register (e.g., a first data bit) may be set from 1 to 0. If a falling edge is detected, the corresponding data bit in the register (e.g., a second data bit) may be set from 0 to 1. By storing the detection result of the peripheral interrupt request signal in the register, the peripheral interrupt request signal may be recorded when the interrupt request signal converter 100 includes the current conversion process. Further, when the interrupt request signal converter 100 is idle, the recorded peripheral interrupt request signal may be converted. By storing the detection result of the peripheral interrupt request signal in the register, the counter of the interrupt request signal converter 100 may also keep counting during the process of generating a single converted interrupt request signal, and realize the related functions of the interrupt request signal converter 100.

The first example of the interrupt request signal conversion system 10 shown in FIG. 4A will be described below in conjunction with FIGS. 7-9.

In the first example of the interrupt request signal conversion system 10 shown in FIG. 4A, the interrupt request signal converter 100 may be configured to receive N peripheral interrupt request signals from a plurality of interrupt request signal input terminals within the clock cycle occupied by the same interrupt reference level signal Ser_BASE, and generate a single converted interrupt request signal SerIRQ (that is, the converted interrupt request signal SerIRQ corresponding to the first interrupt reference level signal Ser_BASE) within the clock cycle occupied by the blank frame B_F of the first interrupt reference level signal Ser_BASE received after the N peripheral interrupt request signals are received based on the N peripheral interrupt request signals. In some embodiments, N may be a positive integer.

In some embodiments, the single converted interrupt request signal SerIRQ (that is, the converted interrupt request signal SerIRQ corresponding to the first interrupt reference level signal Ser_BASE) described above may include N interrupt request identifiers (e.g., SQ1, SQ2, ..., SQN).

In some embodiments, N may be greater than 1. In this case, the interrupt request signal conversion system 10 may increase the processing speed of the interrupt request of the peripheral device for the interface module of the processor receiving the converted interrupt request signal SerIRQ, and increase the upper limit of the number of interrupt request signals sent by the peripheral devices that the interface module can process in a unit time.

For example, for the first example of the interrupt request signal conversion system 10, the predetermined time range may refer to the clock cycle occupied by the same interrupt reference level signal Ser_BASE (that is, the interrupt request signal SerIRQ before the previous conversion of the interrupt reference level signal Ser_BASE that overlaps the generated converted interrupt request signal SerIRQ in time).

In some embodiments, in a first implementation of the first example of the interrupt request signal conversion system 10 shown in FIG. 4A, the interrupt request signal converter 100 may be configured to receive N peripheral interrupt request signals from a plurality of interrupt request signal input terminals within the clock cycle occupied by the same interrupt reference level signal Ser_BASE; generate a plurality of first intermediate signals Inter[1]-Inter[n] within the clock cycle occupied by the blank frame B_F of the first interrupt reference level signal Ser_BASE received after the N peripheral interrupt request signals are received based on the N peripheral interrupt request signals; and perform a logical AND operation on the plurality of first intermediate signals Inter[1]-Inter[n] to generate a converted interrupt request signal SerIRQ (that is, a converted interrupt request signal SerIRQ that overlaps with the first interrupt reference level signal Ser_BASE in time) corresponding to the first interrupt reference level signal Ser_BASE. In some embodiments, the first intermediate signal output by each sub-converter may include a second interrupt identification bit (e.g., M2[1]-M2[n]) corresponding to the input terminal of the interrupt request signal coupled to the sub-converter. In some embodiments, the plurality of second interrupt identification bits included in the plurality of first intermediate signals Inter[1]-Inter[n] may not overlap in time, that is, they may occupy different clock cycles.

In some embodiments, the signals received by the plurality of interrupt request signal input terminals I_s[1]-I_s[n] may include N peripheral interrupt request signals, and a single interrupt request signal SerIRQ (the converted interrupt request signal SerIRQ corresponding to the first interrupt reference level signal Ser_BASE) may include N interrupt request identifiers (SQ1, SQ2, ..., SQN).

Figure 7:
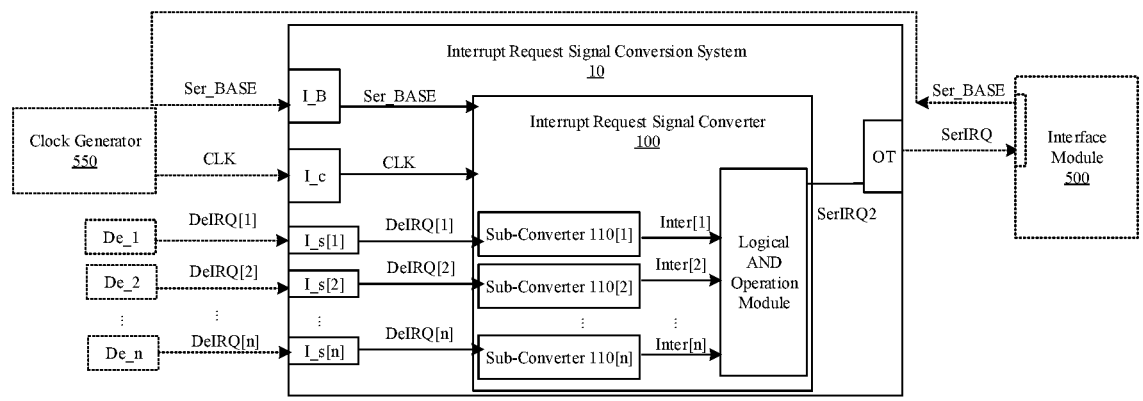
FIG. 7 is a schematic block diagram showing a first implementation of the first example of the interrupt request signal conversion system shown in FIG. 4A.

FIG. 7 is a schematic diagram showing the first implementation of the first example of the interrupt request signal conversion system 10 shown in FIG. 4A. As shown in FIG. 7, the interrupt request signal converter 100 includes a plurality of sub-converters (e.g., sub-converter 110[1]-sub-converter 110[n]) and a logical AND operator. FIG. 8 is a schematic diagram of the j-th sub-converter 110[j] of the interrupt request signal converter 100 shown in FIG. 7, where j may be a positive integer less than or equal to the number of the plurality of sub-converters (or the number of the plurality of interrupt identification bits). FIG. 9 is a schematic diagram showing the interrupt reference level signal Ser_BASE, the peripheral interrupt request signal, the first intermediate signals Inter[1]-Inter[n], and the converted interrupt request signal SerIRQ involved in the interrupt request signal conversion system 10 shown in FIG. 7.

Figure 8:
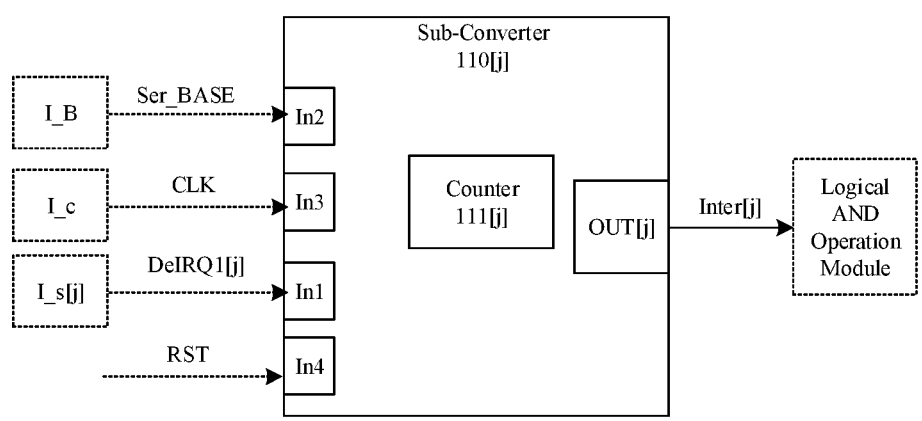
FIG. 8 is a schematic block diagram of a sub-converter of an interrupt request signal converter shown in FIG. 7.

As shown in FIG. 7 and FIG. 8, each of the plurality of sub-converters (e.g., sub-converter 110[1]-sub-converter 110[n]) includes a first input terminal In1, a second input terminal In2, a third input terminal In3, and a fourth input terminal In4.

As shown in FIG. 7 and FIG. 8, the first input terminals In1 of the plurality of sub-converters (e.g., sub-converter 110[1]-sub-converter 110[n]) are configured to be respectively coupled to the plurality of interrupt request signal input terminals I_s[1]-I_s[n]. As shown in FIG. 7 and FIG. 8, the first input terminals In1 of the plurality of sub-converters (e.g., sub-converter 110[1]-sub-converter 110[n]) correspond to, and are respectively coupled to, the plurality of interrupt request signal input terminals I_s[1]-I_s[n] in a one-to-one correspondence.

Figure 9:
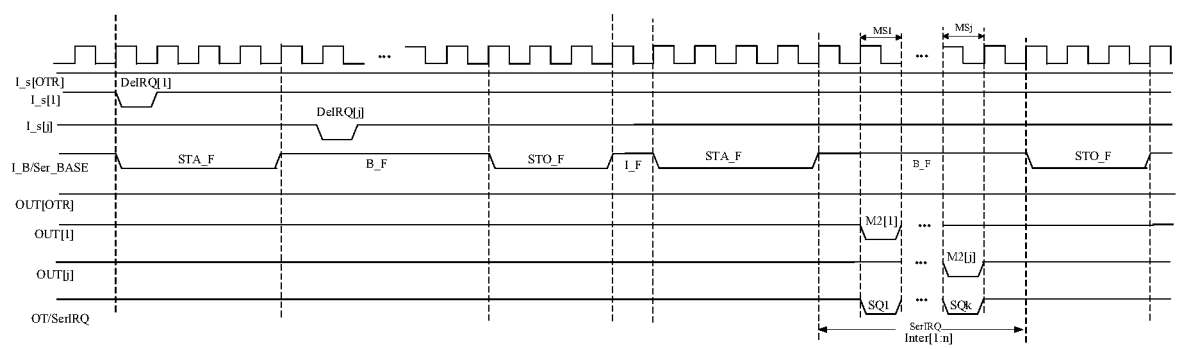
FIG. 9 is a schematic diagram showing an interrupt reference level signal, a peripheral interrupt request signal, a first intermediate signal, and the converted interrupt request signal involved in the interrupt request signal conversion system shown in FIG. 7.

As shown in FIG. 9, the interrupt request signal converter 100 may be configured to receive N (e.g., two) peripheral interrupt request signals from the plurality of interrupt request signal input terminals I_s[1]-I_s[n] in the clock cycle occupied by the same interrupt reference level signal Ser_BASE (e.g., the first interrupt reference level signal Ser_BASE in FIG. 9). That is, within the clock cycle occupied by the same interrupt reference level signal Ser_BASE, the signals received from the plurality of interrupt request signal input terminals I_s[1]-I_s[n] may include N peripheral interrupt request signals. As shown in FIG. 9, the signals received from the interrupt request signal input terminals I_s[1] and I_s[j] include the peripheral interrupt request signals DeIRQ[1] and DeIRQ[j], respectively. Further, the signals received from the plurality of interrupt request signal input terminals I_s[1]-I_s[n] other than the input terminals I_s[1] and I_s[j] do not include the peripheral interrupt request signal (that is, the corresponding levels are all second level).

As shown in FIG. 7 and FIG. 8, the second input terminals In2 of the plurality of sub-converters (e.g., sub-converter 110[1]-sub-converter 110[n]) are configured to be coupled to the interrupt reference level signal input terminal I_B to receive the same interrupt reference level signal Ser_BASE. As shown in FIG. 7 and FIG. 8, the third input terminals In3 of the plurality of sub-converters (e.g., sub-converter 110[1]-sub-converter 110[n]) are configured to be coupled to the clock signal input terminal I_C to receive the same clock signal CLK. Further, the fourth input terminals In4 of the plurality of sub-converters (e.g., sub-converter 110[1]-sub-converter 110[n]) are configured to receive a reset signal RST to perform a reset operation on the sub-converters when required.

As shown in FIG. 7 and FIG. 8, the plurality of sub-converters (e.g., sub-converter 110W-sub-converter 110[n]) are configured to respectively generate a plurality of first intermediate signals Inter[1]-Inter[n].

As shown in FIG. 9, the level of the first intermediate signal Inter[1] output by the output terminal OUT[1] of the sub-converter 110[1] coupled to the interrupt request signal input terminal I_s[1] and the level of the second interrupt identification bit of the first intermediate signal Inter[j] output by the output terminal OUT[j] of the sub-converter 110[j] coupled to the interrupt request signal input terminal I_s[j] are the first level. Further, the level of the second interrupt identification bit of the first intermediate signal Inter[OTR] output by the output terminal OUT[OTR] of the plurality of sub-converters other than the sub-converters 1110[1] and 110[j] is the second level.

As shown in FIG. 7 and FIG. 8, the logical AND operator is configured to generate a conversion corresponding to the first interrupt reference level signal Ser_BASE by performing a logical AND operation on a plurality of first intermediate signals Inter[1]-Inter[n]. By performing logical AND operation on the plurality of first intermediate signals Inter[1]-Inter[n], the interrupt request identifiers formed by the plurality of (more than 1) peripheral interrupt requests triggered by the plurality of peripheral devices (e.g., the interrupt request identifier SQ1 triggered by the first peripheral interrupt request signal DeIRQ[1] and the interrupt request identifier SQk triggered by the k-th peripheral interrupt request signal DeIRQ[j]) within the clock cycle occupied by the same interrupt reference level signal Ser_Base can be combined into the same converted interrupt request signal SerIRQ. In this way, the processing speed of the interface module of the processor receiving the converted interrupt request signal SerIRQ to the interrupt request of the peripheral device can be increased, and the upper limit of the number of interrupt request signals sent by the peripheral device that the interface module can process per unit time can also be increased. For the implementation of the logical AND operator, reference can be made to related technologies, which will not be provided here.

In some embodiments, each of the plurality of sub-converter may be configured to detect whether the signal received by the first input terminal of the sub-converter (e.g., a signal received within a clock cycle occupied by a single interrupt reference level signal Ser_BASE) includes a peripheral interrupt request signal, and set the level of the second identification bit of the first intermediate signal (the first intermediate signal that overlaps with the first interrupt reference level signal after the single interrupt reference level signal described above) output by the sub-converter to the first level when the peripheral interrupt request signal is included in the received signal. In some embodiments, the types of peripheral interrupt request signals detected by the plurality of sub-converters may be the same or not completely the same.

Since the interrupt request signal converter 100 includes a plurality of sub-converters, the method for detecting the peripheral interrupt request signal adopted by each sub-converter can be matched with the peripheral interrupt request signal received by the interrupt request signal input terminal coupled to the sub-converter. In this way, the interrupt request signal conversion system 10 can be compatible with multiple types of peripheral devices, and allow the interrupt request signal converter 100 to combine the interrupt requests of different types of peripheral devices into the interrupt request signal conversion system of a single converted interrupt request signal.

As shown in FIG. 7 and FIG. 8, the j-th sub-converter 110[j] of the plurality of sub-converters (e.g., sub-converter 110[1]-sub-converter 110[n]) is configured to generate the j-th first intermediate signal Inter[j] in the plurality of first intermediate signals Inter[1]-Inter[n] from the signal received by the j-th interrupt request signal input terminal I_s[j] in the plurality of interrupt request signal input terminal I_s[1]-I_s[n].

As shown in FIG. 7 and FIG. 8, the plurality of sub-converters (e.g., sub-converter 110[1]-sub-converter 110[n]) are configured to generate a plurality of first intermediate signals Inter[1]-Inter[n] in the clock cycle occupied by the blank frame B_F of the first interrupt reference level signal Ser_BASE received after receiving N peripheral interrupt request signals based on the N peripheral interrupt request signals.

As shown in FIG. 9, the number of clock cycles occupied by the plurality of first intermediate signals Inter[1]-Inter[n] is equal to the number of clock cycles occupied by the blank frame B_F of the corresponding interrupt reference level signal Ser_BASE. The start time of the plurality of first intermediate signals Inter[1]-Inter[n] is the start time (that is, the end time of the start frame STA_F) of the blank frame B_F of the corresponding interrupt reference level signal Ser_BASE. The end time of the plurality of first intermediate signals Inter[1]-Inter[n] is the end time (that is, the start time of the end frame STO_F) of the blank frame B_F of the corresponding interrupt reference level signal Ser_BASE.

In some embodiments, each of the first intermediate signal may include a second interrupt identification bit corresponding to the input terminal of the interrupt request signal coupled to the sub-converter that outputs each first intermediate signal. As shown in FIG. 7 to FIG. 9, the first intermediate signal Inter[1] output by the output terminal OUT[1] of the first sub-converter has a second interrupt identification bit M2[1]; . . . the first intermediate signal Inter[j] output by the output terminal OUT[j] of the j-th sub-converter 110[j] has a second interrupt identification bit M2[j]; . . . and the first intermediate signal Inter[n] output by the output terminal OUT[n] of the n-th sub-converter has a second interrupt identification bit M2[n] (not shown in the accompanying drawings).

As shown in FIG. 9, when the signals received by the plurality of interrupt request signal input terminals I_s[1]-I_s[n] include N (e.g., two) peripheral interrupt request signals, the converted interrupt request signal SerIRQ corresponding to the first interrupt reference level signal Ser_BASE may include N (e.g., two) interrupt request identifiers (e.g., interrupt request identifier SQ1 and interrupt request identifier SQk).

As shown in FIG. 9, the j-th sub-converter 110[j] may be configured to, in response to the signal received from the j-th interrupt request signal input terminal I_s[j] being the k-th peripheral interrupt request signal of the N peripheral interrupt request signals, causing the second interrupt identification bit M2[j] of the j-th first intermediate signal Inter[j] generated in the clock cycle occupied by the blank frame B_F of the first interrupt reference level signal Ser_BASE received after the k-th peripheral interrupt request signal DeIRQ[j] to be the first level, where k may be a positive integer less than or equal to N.

As shown in FIG. 8 and FIG. 9, each of the plurality of sub-converters (e.g., sub-converter 110[1]-sub-converter 110[n]) may also include a counter (e.g., a corresponding one of the counters 111[1]-111[n]). The j-th sub-converter 110[j] of the plurality of sub-converters (e.g., sub-converter 110[1]-sub-converter 110[n]) may be configured to cause the counter 111[*j*] included in the j-th sub-converter 110[*j*] to start counting in response to receiving the k-th peripheral interrupt request signal DeIRQ[j] in the N peripheral interrupt request signals from the j-th first intermediate signal I_s[j] in the plurality of interrupt request signal input terminals, and detecting the start time STA_F of the first interrupt reference level signal Ser_BASE; and, set the second interrupt identification bit of the first intermediate signal output by the j-th sub-converter 110[*j*] to the first level when the value of the counter 111[*j*] in the j-th sub-converter 110[*j*] is equal to a device identification value that matches the peripheral device that sent the k-th peripheral interrupt request signal DeIRQ[j]. As shown in FIG. 8 and FIG. 9, the second interrupt identification bit set to the first level included in the plurality of first intermediate signals may be used as the interrupt request identifier of the converted interrupt request signal through a logical AND operation. In some embodiments, the first intermediate signal output by the j-th sub-converter 110[*j*] may include the second interrupt identification bit of the first level, which may be used as the interrupt request identifier SQk of the converted interrupt request signal through a logical AND operation. In some embodiments, the device identification value matching the j-th peripheral device may be equal to j*(x_num+1)+x_start, such as j*3+x_start. The device identification value in other examples provided in the embodiments of the present disclosure can have the same or similar definition, which will not be repeated here.

Figure 10:
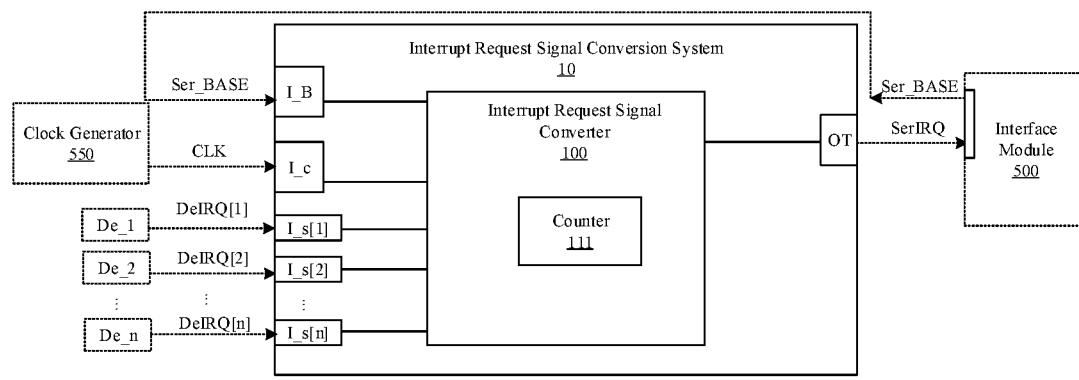
FIG. 10 is a schematic block diagram showing a second implementation of the first example of the interrupt request signal conversion system shown in FIG. 4A.
Figure 11:
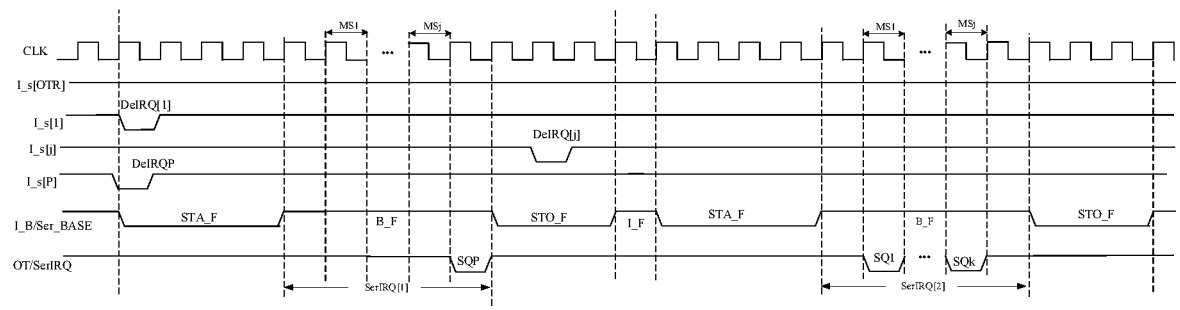
FIG. 11 is a schematic diagram showing the interrupt reference level signal, the peripheral interrupt request signal, and the converted interrupt request signal involved in the interrupt request signal conversion system shown in FIG. 10.

FIG. 10 is a schematic diagram showing a second implementation of the first example of the interrupt request signal conversion system 10 shown in FIG. 4A. In the second implementation of the first example of the interrupt request signal conversion system 10 shown in FIG. 4A, as shown in FIG. 10, the interrupt request signal converter 100 includes a single counter 111. FIG. 11 is a schematic diagram showing the interrupt reference level signal Ser_BASE, the peripheral interrupt request signal, and the converted interrupt request signal SerIRQ involved in the interrupt request signal conversion system 10 shown in FIG. 10.

As shown in FIG. 11, the interrupt request signal converter 100 may be further configured to, in the clock cycle corresponding to the same interrupt reference level signal Ser_BASE, receive and record N peripheral interrupt request signals from a plurality of interrupt request signal input terminals I_s[i]-I_s[n]; detect the start time STA_F of the first interrupt reference level signal Ser_BASE received after the N peripheral interrupt request signals are received in response to receiving N peripheral interrupt request signals; cause the counter 111 to start counting in response to detecting the start frame STA_F of the first interrupt reference level signal Ser_BASE, and set the level of the corresponding part (e.g., the part where the interrupt identification bit corresponding to the N device identification values is positioned) of the interrupt request signal to the first level to form N interrupt request identifiers (e.g., SQ1, SQ2 . . . SQN) corresponding to the N peripheral interrupt request signals when the value of the counter 111 (e.g., the value of the counter 111 in a single counting cycle) is equal to the device identification value (e.g., N device identification values) that matches the peripheral device that sent the N peripheral interrupt request signals.

As shown in FIG. 11, before the N peripheral interrupt request signals (e.g., the first peripheral interrupt request signal DeIRQ[1]) are received, the peripheral interrupt request signal DeIRQP (e.g., the leading edge of the peripheral interrupt request signal DeIRQP, from the P-th interrupt request signal input terminal I_s[P], where P may be a positive integer less than or equal to N) that triggers the counter 111 to start counting has been received, and the peripheral interrupt request signal DeIRQP triggers the interrupt request signal converter 100 to form an interrupt request identifier SQP in the clock cycle occupied by the blank frame B_F of the first interrupt reference level signal Ser_BASE after the interrupt reference level signal Ser_BASE corresponding to the peripheral interrupt request signal DeIRQP. However, the interrupt request signal converter 100 may be configured to generate N interrupt request identifiers corresponding to N peripheral interrupt request signals within the clock cycle occupied by the blank frame B_F of the first interrupt reference level signal Ser_BASE received after receiving the N peripheral interrupt request signals.

FIG. 10 shows that the interrupt request signal conversion system 10 shown in FIG. 4A can also increase the processing speed of the interrupt request of the peripheral device of the interface module of the processor receiving the converted interrupt request signal SerIRQ. The interrupt request signal conversion system 10 shown in FIG. 10 has the same or similar functions to the interrupt request signal conversion system 10 shown in FIG. 7. Therefore, for the functional details of the interrupt request signal conversion system 10 shown in FIG. 10, reference can be made to the related description of the interrupt request signal conversion system 10 shown in FIG. 7, which will not be repeated here.

The second example of the interrupt request signal conversion system 10 shown in FIG. 4A will be described below in conjunction with FIGS. 12-14.

Figure 12:
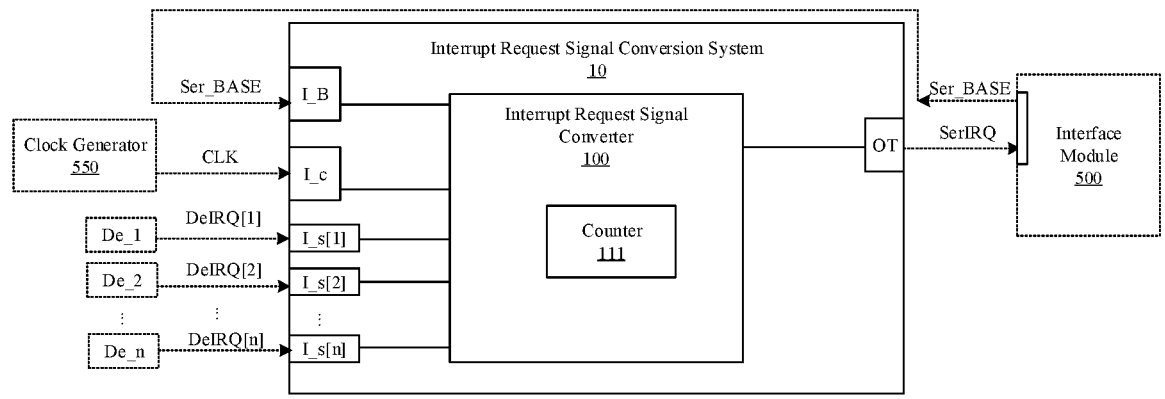
FIG. 12 is a schematic block diagram showing a second example of the interrupt request signal conversion system shown in FIG. 4A.

FIG. 12 is a schematic diagram of the second example of the interrupt request signal conversion system 10 shown in FIG. 4A. As shown in FIG. 12, the interrupt request signal converter 100 includes a counter 111. In some embodiments, the interrupt request signal converter 100 shown in FIG. 12 may enable the interrupt request of the peripheral device to be sent to the interface module of the processor faster.

For the second example of the interrupt request signal conversion system 10, for the k-th peripheral interrupt request signal, the predetermined time range may refer to the clock cycle occupied by the portion between the two interrupt identification bits corresponding to the k-th peripheral interrupt request signal that form two adjacent converted interrupt request signals SerIRQs. For example, the predetermined time range may refer to the time range between the formation of the two interrupt identification bits between after the previous interrupt identification bit and the next interrupt identification bit.

In some embodiments, the interrupt request signal converter 100 may be configured to form the converted interrupt request signal SerIRQ corresponding to the k-th peripheral interrupt request signal DeIRQ[j] in the clock cycle occupied by the blank frame B_F of the currently received interrupt reference level signal Ser_BASE (that is, the interrupt reference level signal received when the k-th peripheral interrupt request signal DeIRQ[j] is received) in response to the counter 111 being in the counting state and the k-th device identification value being not missed when the k-th peripheral interrupt request signal DeIRQ[j] is received. In some embodiments, when the value of the counter 111 is equal to the k-th device identification value, an interrupt request identifier corresponding to the k-th peripheral interrupt request signal DeIRQ[j] may be formed.

It should be noted that the converted interrupt request signal SerIRQ corresponding to the k-th peripheral interrupt request signal DeIRQ[j] may refer to the converted interrupt request signal SerIRQ including the interrupt request identifier triggered by the k-th peripheral interrupt request signal DeIRQ[j]. The converted interrupt request signal SerIRQ corresponding to the k-th peripheral interrupt request signal DeIRQ[j] in other embodiments has the same or similar definition, which will not be repeated herein.

Figure 13:
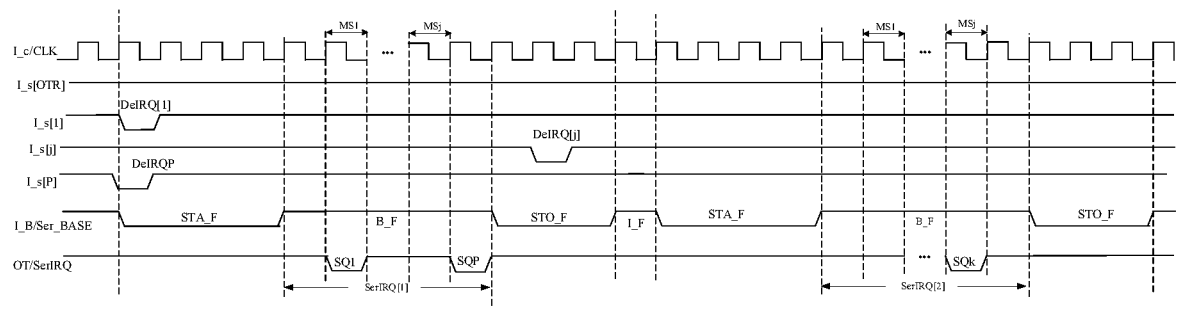
FIG. 13 and FIG. 14 are first and second schematic diagrams showing the interrupt reference level signal, the peripheral interrupt request signal, and the converted interrupt request signal involved in the interrupt request signal conversion system shown in FIG. 12, respectively.

FIG. 13 is a first schematic diagram showing the interrupt reference level signal Ser_BASE, the peripheral interrupt request signal, and the converted interrupt request signal SerIRQ involved in the interrupt request signal conversion system 10 shown in FIG. 12.

As shown in FIG. 13, before the first peripheral interrupt request signal DeIRQ[1] is received, the peripheral interrupt request signal DeIRQP that triggers the counter 111 to start counting has been received, and the counter 111 is in the counting state and the first device identification value has not been missed. Therefore, the interrupt request signal converter 100 forms a converted interrupt request signal SerIRQ (that is, SerIRQ[1]) corresponding to the first peripheral interrupt request signal in the clock cycle occupied by the blank frame B_F of the currently received interrupt reference level signal Ser_BASE. In some embodiments, when the value of the counter 111 is equal to the first device identification value, an interrupt request identifier SQ1 corresponding to the first peripheral interrupt request signal SerIRQ[1] may be formed.

As shown in FIG. 13, the peripheral interrupt request signal DeIRQP (e.g., the leading edge of the peripheral interrupt request signal DeIRQP) triggers the interrupt request signal converter 100 to form the interrupt request identifier SQP in the clock cycle occupied by the blank frame B_F of the first interrupt reference level signal Ser_BASE (e.g., the interrupt reference level signal overlapping with the peripheral interrupt request signal DeIRQP) after the interrupt reference level signal Ser_BASE corresponding to the peripheral interrupt request signal DeIRQP. In some embodiments, the number of the peripheral interrupt request signal may be used to indicate the position of the interrupt identification bit corresponding to the peripheral interrupt request signal. For example, the first peripheral interrupt request signal may be used to trigger the peripheral interrupt request signal that forms the interrupt request identifier at the first interrupt identification bit.

In some embodiments, the interrupt request signal converter 100 may be configured to form a converted interrupt request signal SerIRQ corresponding to the k-th peripheral interrupt request signal DeIRQ[j] in the clock cycle occupied by the blank frame B_F of the first interrupt reference level signal Ser_BASE received after receiving the k-th peripheral interrupt request signal DeIRQP in response to k-th peripheral interrupt request signal DeIRQ[j] the counter 111 being in the counting state but missing the k-th device identification value that matches the peripheral device that sent the k-th peripheral interrupt request signal DeIRQ[j] when the k-th peripheral interrupt request signal DeIRQ[j] is received. In some embodiments, the counter 111 may be placed in a recounting state after detecting the start frame STA_F of the first interrupt reference level signal Ser_BASE, and the interrupt request identifier corresponding to the k-th peripheral interrupt request signal DeIRQ[j] may be formed when the recounted value of the counter 111 is equal to the k-th device identification value. In some embodiments, after receiving the end frame of the current interrupt reference level signal or after the value of the counter 111 reaches a preset boundary value (e.g., a preset upper limit), the counter 111 may be reset.

As shown in FIG. 13, since the k-th peripheral interrupt request signal DeIRQ[j] of the N peripheral interrupt request signals is received, although the counter 111 is in the counting state, when the counter 111 misses the k-th device identification value that matches the peripheral device that sent the k-th peripheral interrupt request signal DeIRQ[j], the interrupt request signal converter 100 may be configured to form the converted interrupt request signal SerIRQ[2] corresponding to the k-th peripheral interrupt request signal DeIRQ[j] in the clock cycle occupied by the blank frame B_F of the first interrupt reference level signal Ser_BASE received after receiving the k-th peripheral interrupt request signal DeIRQP. In some embodiments, the interrupt request signal converter 100 may form an interrupt request identifier SQk corresponding to the k-th peripheral interrupt request signal when the recounted value of the counter 111 is equal to the k-th device identification value.

In some embodiments, the counter 111 missing the k-th device identification value may be that the value of the counter 111 has passed the k-th device identification value in the current counting cycle of the counter 111. For example, when the counter 111 is an up counter, the current value of the counter 111 passing the k-th device identification value may be that the current value of the counter 111 is already greater than the k-th device identification value, and when the counter 111 is a down counter, the current value of the counter 111 passing the k-th device identification value may be that the current value of the counter 111 is already less than the k-th device identification value. In other embodiments of the present disclosure, the counter 111 missing the k-th device identification value has the same or similar definition, which will not be repeated herein.

In some embodiments, in response to the counter 111 being reset and being not in the counting state when the k-th peripheral interrupt request signal in the N peripheral interrupt request signals is received, a converted interrupt request signal SerIRQ corresponding to the k-th peripheral interrupt request signal may be generated in the clock cycle occupied by the blank frame B_F of the first interrupt reference level signal Ser_BASE received after the k-th peripheral interrupt request signal is received. In some embodiments, after detecting the start frame STA_F of the first interrupt reference level signal Ser_BASE, the counter 111 may be placed in a counting state, and when the value of the counter 111 is equal to the k-th device identification value, an interrupt request identifier corresponding to the k-th peripheral interrupt request signal may be formed. An exemplary description is provided below in conjunction with FIG. 14.

Figure 14:
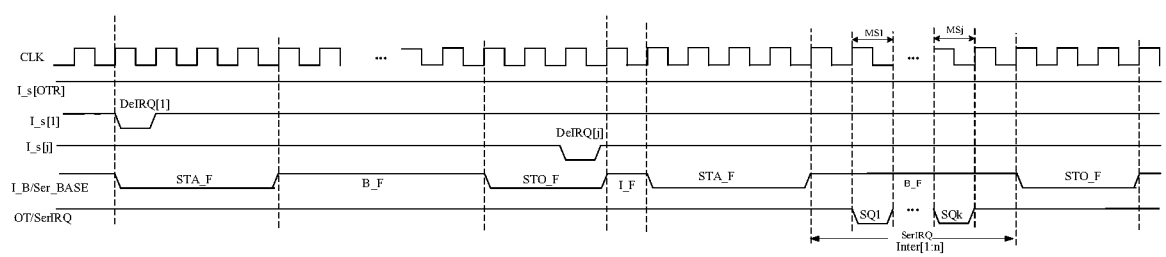

FIG. 14 is a second schematic diagram showing the interrupt reference level signal Ser_BASE, the peripheral interrupt request signal, and the converted interrupt request signal SerIRQ involved in the interrupt request signal conversion system 10 shown in FIG. 12.

As shown in FIG. 14, as the first peripheral interrupt request signal DeIRQ[1] is received, the counter 111 is not in the counting state, therefore, a converted interrupt request signal SerIRQ corresponding to the first peripheral interrupt request signal may be generated in the clock cycle occupied by the blank frame B_F of the first interrupt reference level signal Ser_BASE (that is, the second interrupt reference level signal Ser_BASE in FIG. 14) after receiving the first peripheral interrupt request signal DeIRQ[1]. In some embodiments, after the counter 111 starts counting and the value of the counter 111 is equal to the k-th device identification value, an interrupt request identifier corresponding to the k-th peripheral interrupt request signal may be formed.

Figure 15:
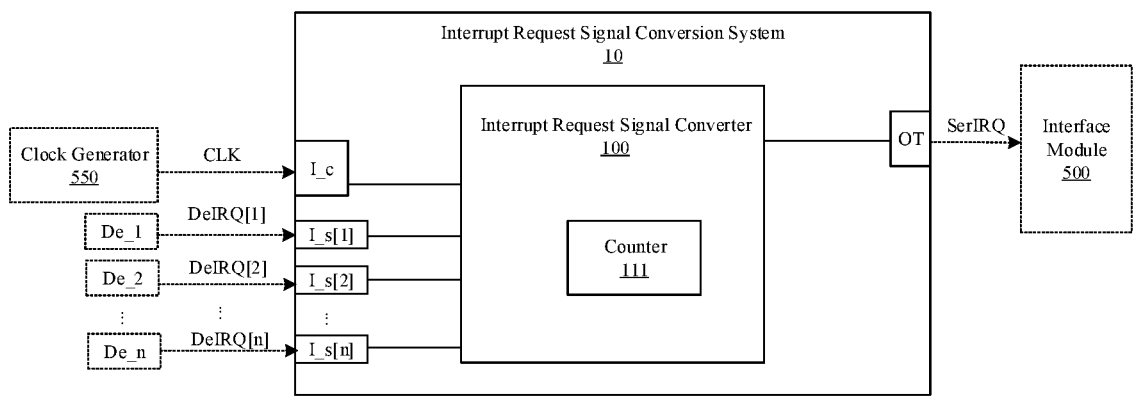
FIG. 15 is a schematic block diagram showing an example of the interrupt request signal conversion system shown in FIG. 4B.

FIG. 15 is a schematic diagram showing an example of the interrupt request signal conversion system 10 shown in FIG. 4B. As shown in FIG. 15, the interrupt request signal converter 100 includes a counter 111.

Figure 16:
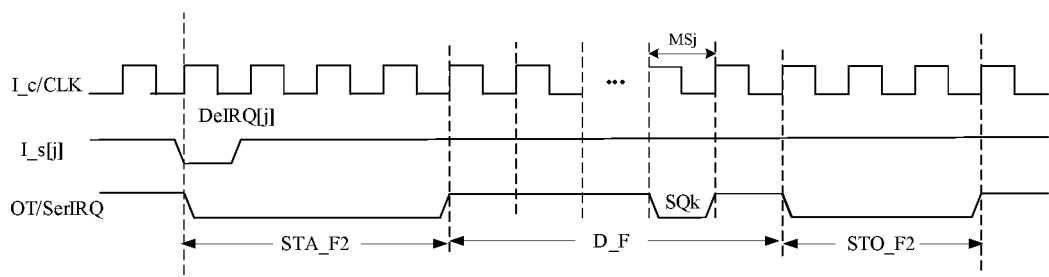
FIG. 16 to FIG. 18 are first to third schematic diagrams of the peripheral interrupt request signal and the converted interrupt request signal involved in the interrupt request signal conversion system shown in FIG. 15.

FIG. 16 is a first schematic diagram showing the peripheral interrupt request signal and the converted interrupt request signal SerIRQ involved in the interrupt request signal conversion system 10 shown in FIG. 15.

As shown in FIG. 16, the interrupt request signal converter 100 may be further configured to cause the counter 111 to start counting in response to receiving the k-th peripheral interrupt request signal DeIRQ[j] of the N peripheral interrupt request signals (the k-th peripheral interrupt request signal received from the j-th interrupt request signal input terminal), the counter 111 being reset and not being in the counting state.

As shown in FIG. 16, the interrupt request signal converter 100 may be further configured to form the start frame STA_F of the converted interrupt request signal SerIRQ corresponding to the k-th peripheral interrupt request signal in response to the value of the counter 111 being between a reset value of the counter 111 and a first value. In some embodiments, the value of the counter 111 being between the reset value and the first value to form the start frame STA_F may be that when the value of the counter 111 is equal to either one of the first value (e.g., 1) and the first value (e.g., 4) after the reset value (e.g., 0), the corresponding part of the converted interrupt request signal may be set to the first level.

As shown in FIG. 16, the interrupt request signal converter 100 may be further configured to form an interrupt request identifier of the converted interrupt request signal SerIRQ corresponding to the k-th peripheral interrupt request signal in response to the value of the counter 111 being equal to the k-th device identification value. Here, the k-th device identification value may match the peripheral device that sent the k-th peripheral interrupt request signal.

As shown in FIG. 16, the interrupt request signal converter 100 may be further configured to form the end frame STO_F of the converted interrupt request signal SerIRQ corresponding to the k-th peripheral interrupt request signal in response to the value of the counter 111 being between a second value and a third value. Here, the reset value of the counter 111, the first value, the device identification value, the second value, and the third value may all be non-negative integers and change monotonously.

In some embodiments, the reset value of the counter 111, the first value, the device identification value, the second value, and the third value may increase sequentially, i.e., the device identification value is larger than the first value, the second value is larger than the device identification value, and the third value is larger than the second value. For example, the length of time occupied by the start frame STA_F, the data frame D_F, and the end frame STO_F of the converted interrupt request signal SerIRQ may be equal to the predetermined values, such as x_start, x_data, and x_stop, by setting the reset value, the first value, the device identification value, the second value, and the third value of the counter 111. In some embodiments, the device identification value matching the t-th peripheral device may equal to t*(x_num+1)+x_start, such as t*3+x_start, where t may be a positive integer less than or equal to n.

In some embodiments, the reset value of the counter 111, the first value, the second value, and the third value may be set based on the relevant protocol of the interface module of the processor. For example, for the interface module shown in FIG. 5A, the reset value of the counter 111, the first value, the second value, and the third value may be set to 0, 4, 57, and 59, respectively.

Figure 17:
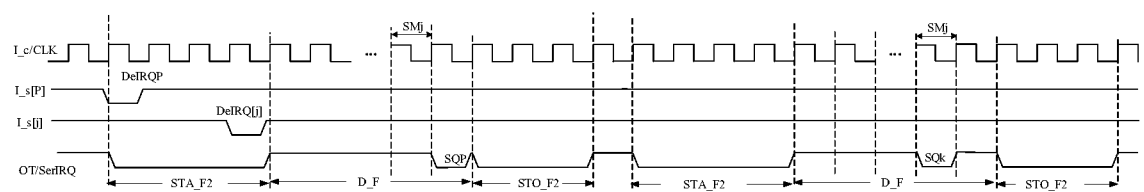

FIG. 17 is a second schematic diagram showing the peripheral interrupt request signal and the converted interrupt request signal SerIRQ involved in the interrupt request signal conversion system 10 shown in FIG. 15.

In some embodiments, the interrupt request signal converter 100 may be configured to reset the counter 111 and start recounting in response to receiving the k-th peripheral interrupt request signal DeIRQ[j], the counter 111 is in the counting state, and after the value of the counter 111 reaches a preset boundary value (e.g., the upper limit, e.g., the third value), where the second value, the third value, and the preset boundary value may change monotonously; and form the start frame STA_F, the interrupt request identifier, and the end frame STO_F of the converted interrupt request signal SerIRQ corresponding to the k-th peripheral interrupt request signal DeIRQ[j] in response to the recounting value of the counter 111 being selected between the reset value of the counter 111 and the first value, the k-th device identification value, and between the second value and the third value.

As shown in FIG. 17, before the k-th peripheral interrupt request signal DeIRQ[j] is received, the peripheral interrupt request signal DeIRQP (triggered to form an interrupt request identifier SQP) that triggers the counter 111 to start counting has been received. That is, when the k-th peripheral interrupt request signal DeIRQ[j] is received, the counter 111 is in the counting state. As shown in FIG. 17, although the counter 111 does not miss the k-th device identification value, the interrupt request signal converter 100 can form a converted interrupt request signal corresponding to the k-th peripheral interrupt request signal DeIRQ[j] after the counter 111 starts recounting. More specifically, the interrupt request signal converter 100 may form the start frame STA_F of the converted interrupt request signal SerIRQ corresponding to the k-th peripheral interrupt request signal DeIRQ[j] after the recounted value of the counter 111 is between the reset value of the counter 111 and the first value; form an interrupt request identifier SQk of the converted interrupt request signal SerIRQ corresponding to the k-th peripheral interrupt request signal DeIRQ[j] when the recounted value of the counter 111 is equal to the k-th device identification value; and form the end frame STO_F of the converted interrupt request signal SerIRQ corresponding to the k-th peripheral interrupt request signal DeIRQ[j] when the recounted value of the counter 111 is between the second value and the third value.

For the example shown in FIG. 17, when the counter 111 is in the counting state, the peripheral interrupt request signals (e.g., the plurality of peripheral interrupt request signals) received in the current counting cycle of the counter 111 may all be recorded. Then in the next counting cycle of the counter 111, corresponding middle request identifiers (e.g., a plurality of middle request identifiers) and the interrupt request signal including these middle request identifiers may be formed based on the peripheral interrupt request signals recorded in the current counting cycle. For the example shown in FIG. 17, it is also possible to increase the processing speed of the peripheral device's interrupt request of the interface module of the processor receiving the converted interrupt request signal SerIRQ.

For the example shown in FIG. 17, the predetermined time range may refer to the clock cycle occupied by the current counting cycle of the counter 111 (that is, the counting cycle before the counting cycle forming the converted interrupt request signal SerIRQ).

Figure 18:
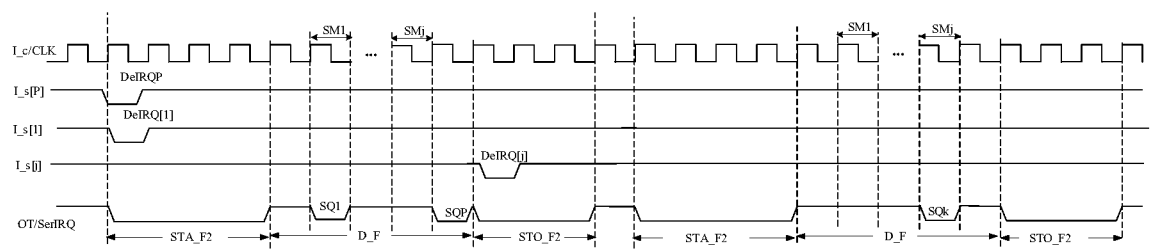

FIG. 18 is a third schematic diagram showing the peripheral interrupt request signal and the converted interrupt request signal SerIRQ involved in the interrupt request signal conversion system 10 shown in FIG. 15.

As shown in FIG. 18, the interrupt request signal converter 100 may be further configured to form an interrupt request identifier SQk corresponding to the converted interrupt request signal SerIRQ of the k-th peripheral interrupt request signal DeIRQ[j] in response to receiving the k-th peripheral interrupt request signal DeIRQ[j], the counter 111 is in the counting state and the k-th device identification value is not missed, and when the value of the counter 111 is equal to the k-th device identification value.

As shown in FIG. 18, before the first peripheral interrupt request signal DeIRQ[1] is received, the peripheral interrupt request signal DeIRQP (triggered to form an interrupt request identifier SQP) that triggers the counter 111 to start counting has been received. That is, when the first peripheral interrupt request signal DeIRQ[1] is received, the counter 111 is in the counting state. As shown in FIG. 17, since the counter 111 does not miss the first device identification value, when the value of the counter 111 is equal to the first device identification value, the interrupt request signal converter 100 can form an interrupt request identifier SQ1 of the converted interrupt request signal SerIRQ corresponding to the first peripheral interrupt request signal DeIRQ[1].

As shown in FIG. 18, the start frame STA_F, the interrupt request identifier, and the end frame STO_F of the converted interrupt request signal SerIRQ corresponding to the k-th peripheral interrupt request signal DeIRQ[j] can be formed when the recounted value of the counter 111 is selected from between the reset value of the counter 111 and the first value, the k-th device identification value, and between the second value and the third value in response to receiving the k-th peripheral interrupt request signal DeIRQ[j], and the counter 111 is in the counting state and missed the k-th device identification value.

As shown in FIG. 18, although the counter 111 is in the counting state when the k-th peripheral interrupt request signal DeIRQ[j] is received, the counter 111 misses the k-th device identification value. Therefore, the interrupt request signal converter 100 can form the start frame STA_F, the interrupt request identifier, and the end frame STO_F of the converted interrupt request signal SerIRQ corresponding to the k-th peripheral interrupt request signal DeIRQ[j] when the recounted value is selected from between the reset value of the counter 111 and the first value, the k-th device identification value, and between the second value and the third value.

In some embodiments, the interrupt request signal converter 100 provided in FIG. 18 may include an interface module of a processor that can enable the interrupt request of a peripheral device to be sent more quickly.

For the example shown in FIG. 18, for the k-th peripheral interrupt request signal, the predetermined time range may refer to the time range from the time when the current counting cycle (that is, the counting cycle before the counting cycle of the converted interrupt request signal SerIRQ is formed) value of the counter 111 is the k-th device identification value to the time when the recounted value of the counter 111 is the k-th device identification value.

Regarding the interrupt request signal conversion system 10 in the embodiments of the present disclosure, the following points need to be explained.
    (1) It should be noted that, in order to better understand the interrupt request signal conversion system 10, the schematic diagram of the interrupt request signal conversion system 10 of at least one embodiment of the present disclosure (e.g., FIG. 1 and FIG. 5A) shows the relevant structure of the interface module of the processor, however, the interrupt request signal conversion system 10 provided by at least one embodiment of the present disclosure is not limited to being applied to the interface module 500 of the processor shown in FIG. 1 and FIG. 5A, and interface modules with other suitable processors may also be applied. For example, the interface module of the processor may also be a universal asynchronous receiver/transmitter (UART) interface module, a reduced gigabit media independent interface (RGMII) module, a peripheral component interconnect express (PCIe) interface module, or other suitable interface modules. Those skilled in the art can understand that after changing the target interface module of the interrupt request signal conversion system 10, the specific form of the converted interrupt request signal and the structure and function of the corresponding components of the interrupt request signal conversion system 10 can be set based on the target interface module.
    (2) Although the peripheral interrupt request signals shown in the multiple drawings of at least one embodiment of the present disclosure are all signals that use a low level to indicate an interrupt request, the interrupt request signal conversion system of at least one embodiment of the present disclosure is not limited thereto. For example, the peripheral interrupt request signal of at least one embodiment of the present disclosure may also be a peripheral interrupt request signal having a start frame and an end frame, or a peripheral interrupt request signal of other suitable forms. In another example, the peripheral interrupt request signal of at least one embodiment of the present disclosure may also be a peripheral interrupt request signal output by a UART interface or a peripheral interrupt request signal forwarded by a baseboard manager controller (BMC). Those skilled in the art can understand that when the type of the target peripheral device of the interrupt request signal conversion system changes, the interrupt request signal conversion system provided by at least one embodiment of the present disclosure can be adapted to the modified peripheral device by changing the method for the interrupt request signal converter to detect the peripheral interrupt request signal, and the interrupt request of the changed peripheral device can be converted into a converted interrupt request signal that can be recognized by the interface module of the processor.
    (3) Although the peripheral interrupt request signals shown in the multiple drawings of at least one embodiment of the present disclosure are all signals of the same type of interrupt request, the interrupt request signal conversion system of at least one embodiment of the present disclosure is not limited thereto. For example, there may be more than one interrupt request signal input terminal connections of the interrupt request signal conversion system of the at least one embodiment of the present disclosure. For example, based on the interrupt request signal conversion system 10 shown in FIG. 7, the method of detecting the peripheral interrupt request signal adopted by each sub-converter may match the peripheral interrupt request signal received by the interrupt request signal input terminal coupled to the sub-converter for the interrupt request signal conversion system to combine the interrupt requests of different types of peripheral devices into a single converted interrupt request signal.

(4) Although the multiple drawings of the interrupt request signal conversion system 10 of at least one embodiment of the present disclosure have multiple interrupt request signal input terminals and a single signal output terminal, the interrupt request signal conversion system of at least one embodiment of the present disclosure is not limited thereto. Without considering the processing speed of the interrupt request of the peripheral device of the interface module of the processor, the interrupt request signal conversion system 10 may include a single interrupt request signal input terminal and a single signal output terminal, or the interrupt request signal conversion system 10 may include a plurality of interrupt request signal input terminals and a plurality of signal output terminals corresponding to the plurality of interrupt request signal input terminals in a one-to-one correspondence. For example, when the interrupt request signal conversion system 10 includes a plurality of interrupt request signal input terminals and a plurality of signal output terminals, the peripheral interrupt request signal input from each interrupt request signal input terminal may be converted into a converted interrupt request signal and output from the signal output terminal corresponding to the interrupt request signal input terminal. In another example, the logical AND operator may be removed on the basis of the interrupt request signal conversion system 10 shown in FIG. 7, and a suitable number of signal output terminals may be added to realize an interrupt request signal conversion system having multiple interrupt request signal input terminals and multiple signal output terminals.

(5) Although the clock signal input terminal I_c is shown in multiple drawings of the interrupt request signal conversion system 10 of at least one embodiment of the present disclosure, the interrupt request signal conversion system of at least one embodiment of the present disclosure is not limited thereto. For example, when the interface module (e.g., the UART interface) coupled to the interrupt request signal conversion system does not require a clock signal, the interrupt request signal conversion system may not include the clock signal input terminal I_c.

(6) For the sake of brevity, the foregoing description mainly describes the time (clock cycle) when the first level is set in the process of generating the converted interrupt request signal. Those skilled in the art can understand that, in some embodiments, at the time (clock cycle) when the first level is not clearly specified, the interrupt request signal conversion system may set the level of the corresponding part of the converted interrupt request signal to the second level, or set the level with the reference to the level shown in the relevant drawings of at least one embodiment of the present disclosure.

(7) The interrupt reference level signal Ser_BASE, the intermediate signal, the peripheral interrupt request signal, and the converted interrupt request signal SerIRQ shown in the multiple drawings of at least one embodiment of the present disclosure are examples, and are used to clearly describe the functions of the relevant components of the interrupt request signal conversion system 10. The converted interrupt request signal SerIRQ output by the interrupt request signal conversion system 10 of at least one embodiment of the present disclosure may generate corresponding changes based on changes in the peripheral interrupt request signal.

(8) The functions described in at least one embodiment of the present disclosure can be implemented by hardware, software, firmware, or any combination thereof.

Figure 19:
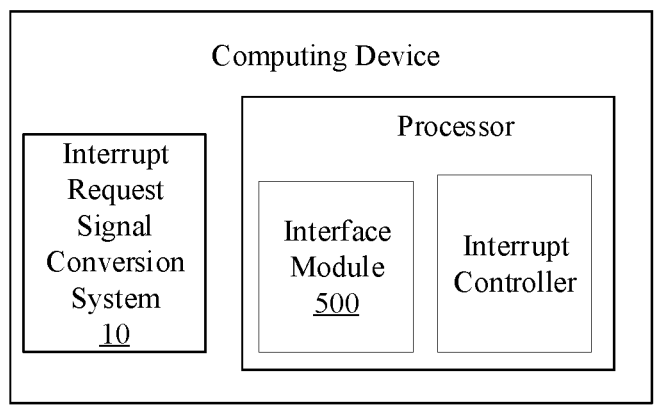
FIG. 19 is a schematic block diagram of a computing device according to an embodiment of the present disclosure.

The present disclosure further provides a computing device. FIG. 19 is a schematic diagram of a computing device according to an embodiment of the present disclosure. As shown in FIG. 19, the computing device includes a processor and the interrupt request signal conversion system 10 provided by any embodiment of the present disclosure. As shown in FIG. 19, the processor includes an interface module 500 and interrupt controller. The interface module 500 includes an interface controller 510, and the interface controller 510 may be configured to report an interrupt request of a peripheral device requesting an interrupt to the interrupt controller based on at least one converted interrupt request signal SerIRQ. In some embodiments, the computing device may expand the types of applicable peripheral devices.

In the first example, referring to FIG. 6A, the interface module 500 may be configured to send at least one interrupt reference level signal Ser_BASE to the interrupt request signal conversion system 10. Each interrupt reference level signal Ser_BASE may include a start frame STA_F and an end frame STO_F. The interface controller 510 may be further configured to use the end of the start frame STA_F of the interrupt reference level signal Ser_BASE corresponding to each converted interrupt request signal SerIRQ as the start time of each converted interrupt request signal SerIRQ, and determine the peripheral device that requests the interrupt identified by the interrupt identification bit of the first level based on the number of clock cycles between the converted interrupt request signal SerIRQ and the start time (that is, the end time of the start frame STA_F of the interrupt reference level signal Ser_Base) in at least one converted interrupt request signal SerIRQ that is the first level interrupt identification bit. In some embodiments, the interface module 500 may be configured to report the interrupt requests of all peripheral devices that request the interrupts identified by each converted interrupt request signal SerIRQ after the end frame STO_F is sent to the interrupt request signal conversion system 10.

In the second example, each converted interrupt request signal SerIRQ may include a start frame STA_F2 and an end frame STO_F2 (see FIG. 6B). The interface controller 510 may be further configured to determine the peripheral device that requests the interrupt identified by the interrupt identification bit of the first level based on the number of clock cycles between the interrupt identification bit of the first level in each converted interrupt request signal SerIRQ and the start frame STA_F2. In some embodiments, in the second example, the interface controller 510 may be further configured to report the interrupt request of the peripheral device requesting interrupt related to the interrupt request signal SerIRQ after receiving the end frame STO_F2 of the interrupt request signal SerIRQ.

In some embodiments, the interface module 500 of the processor may be implemented as the interface module 500 shown in FIG. 5A. As shown in FIG. 5A, the interface controller 510 of the interface module 500 also includes an interrupt clear/suspend module 512. The interrupt clear/suspend module 512 includes a mask register 512a for the interrupt mode, and the mask register 512a includes an interrupt mask identification bit.

In some embodiments, the interrupt clear/suspend module 512 may be configured to suspend or clear the interrupt request reported by the interrupter 511 based on the value of the interrupt mask identification bit. For example, when the value of the interrupt mask identification bit is a first value (e.g., 1), the interrupt clear/suspend module 512 may mask (clear) the interrupt request reported by the interrupter 511. In this way, the interrupt request received from the peripheral device can be masked (cleared) and cannot be reported to the processor core. In another example, when the value of the interrupt mask identification bit is different from the first value (e.g., 0), the interrupt clear/suspend module 512 may suspend the interrupt request reported by the interrupter 511. In this way, the interrupt request received from the peripheral device can be reported to the processor core.

In some embodiments, when the interrupt mode of the interface module 500 also includes a direct memory access (DMA) interrupt mode, the interface module 500 may also include a second interrupter, and the mask register 512a may also include a second interrupt mask identification bit. In some embodiments, the interrupt clear/suspend module 512 may be configured to suspend or clear the interrupt request reported by the second interrupter based on the value of the second interrupt mask identification bit. In some embodiments, the interrupt mask identification bit may be located higher than the second interrupt mask identification bit. By enabling the interrupt clear/suspend module 512 to include the mask register 512a, whether to perform the interrupt can be controlled by software.

It should be noted that the mask register 512a is not limited to being set in the interrupt clear/suspend module 512, but may also be set in the interrupter 511 or the third interface 533. Correspondingly, the interrupter 511 or the third interface 533 may determine whether to mask (clear) the interrupt request received from the peripheral device based on the value of the interrupt mask identification bit, such that interrupt request cannot be reported to the processor core. In some embodiments, the third interface 533 may perform a logical AND operation (e.g., or logical operation) on at least part of the interrupt request signal SerIRQ and the value of the interrupt mask identification bit, and send the result of the logical operation to the interrupter 511. In this case, if the value of the interrupt mask identification bit is the first value (e.g., 1), the level of at least part of the interrupt identification bit may be set to the second level, and at least part of the interrupt identification bit can be masked (cleared). Further, if the value of the interrupt mask identification bit is the second value (e.g., 0), the interrupt request signal SerIRQ may remain unchanged.

Figure 20:
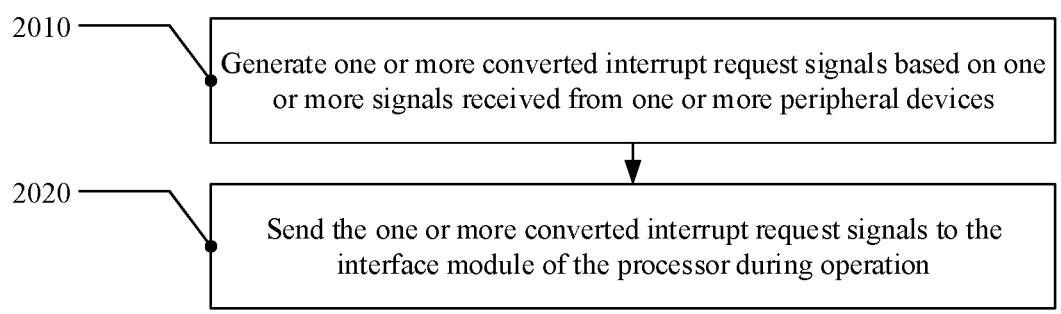
FIG. 20 is a flowchart of an interrupt request signal conversion method according to an embodiment of the present disclosure.

The present disclosure further provides an interrupt request signal conversion method. FIG. 20 is a flowchart of an interrupt request signal conversion method according to an embodiment of the present disclosure. The method will be described in detail below.

2010, generating one or more converted interrupt request signals based on one or more signals received from one or more peripheral devices.

2020, during operation, sending the one or more converted interrupt request signals to the interface module of the processor.

In some embodiments, each converted interrupt request signal may include a plurality of interrupt identification bits. Each interrupt identification bit may be used to identify whether the signal received from the peripheral device corresponding to each interrupt identification bit includes a peripheral interrupt request signal within a predetermined time range based on a first level and a second level that may be different from the first level.

The interrupt request signal conversion method can expand the types of peripheral devices suitable for the interface module of the processor that receives the converted interrupt request signal obtained based on the interrupt request signal conversion method. For the specific implementation of the processes described above, reference can be made to the related examples of the interrupt request signal conversion, which will not be repeated here.

Although the disclosure have been described above in detail with general descriptions and specific embodiments, on the basis of the embodiments of the disclosure, various changes and improvements may be made, which is apparent to those skilled in the art. Therefore, all such changes and improvements without departing from the spirit of the disclosure are within the scope of the disclosure.

It should be noted that the above description is merely associated with embodiments of the present disclosure and is not intended to limit the scope of the present disclosure. Those skilled in the art should understand that various modifications may be made in the present disclosure, or equivalent replacements of some or all of the technical features may be made in the present disclosure. The modifications and equivalent replacements made within the spirit and principle of the present disclosure should be included in the scope of the present disclosure.

What is claimed is:

1. An interrupt request signal conversion system comprising:
    an interrupt request signal converter configured to generate one or more converted interrupt request signals based on one or more signals received from a plurality of peripheral devices, each of the one or more converted interrupt request signals including a plurality of interrupt identification bits each used to identify, based on a first level and a second level different from the first level, whether a signal received from a corresponding one of the one or more peripheral devices within a predetermined time range includes a peripheral interrupt request signal;
    a plurality of interrupt request signal input terminals configured to be coupled to the plurality of peripheral devices, respectively; and
    a signal output terminal configured to send the one or more converted interrupt request signals to an interface module of a processor during operation;
    wherein;
    the interrupt request signal converter is further configured to receive one or more interrupt reference level signals corresponding to the one or more converted interrupt request signals from the interface module; wherein each of the one or more interrupt reference level signals includes a start frame, an end frame, and a blank frame located between the start frame and the end frame;
    in response to the signals received from the plurality of peripheral devices including N peripheral interrupt request signals, N being a positive integer, the interrupt request signal converter is further configured to:
    receive the N peripheral interrupt request signals from the plurality of interrupt request signal input terminals within one or more clock cycles occupied by a same one of the one or more interrupt reference level signals;
    generate, based on the N peripheral interrupt request signals, a plurality of intermediate signals within one or more clock cycles occupied by the blank frame of a first interrupt reference level signal among the one or more interrupt reference level signals that is first received after the N peripheral interrupt request signals are received; and perform a logical AND operation on the plurality of intermediate signals to generate one converted interrupt request signal of the one or more converted interrupt request signals that corresponds to the first interrupt reference level signal;

each of the intermediate signals includes an interrupt identification bit corresponding to the interrupt request signal input terminal coupled to a sub-converter that outputs each of the intermediate signals;

the plurality of interrupt request signal input terminals are configured to receive the N peripheral interrupt request signals; and the peripheral interrupt request signal corresponding to the first interrupt reference level signal includes the N interrupt request identifiers.

2. The conversion system of claim 1, wherein:
the one or more peripheral devices include a plurality of peripheral devices;
the plurality of interrupt request signal input terminals are configured to be coupled to the plurality of peripheral devices, respectively; and
each of the plurality of interrupt identification bits corresponds to one interrupt request signal input terminal of the plurality of interrupt request signal input terminals and uses the first level and the second level to respectively identify whether or not the signal received from one of the plurality of peripheral device coupled to the one interrupt request signal input terminal includes the peripheral interrupt request signal.

3. The conversion system of claim 2, wherein the interrupt request signal converter is further configured to:
in response to the signals received from the plurality of peripheral devices including the N peripheral interrupt request signals, cause the one or more converted interrupt request signals to include N interrupt request identifiers respectively corresponding to the N peripheral interrupt request signals, and the N interrupt request identifiers being N interrupt identification bits of the first level.

4. The conversion system of claim 3, wherein the interrupt request signal converter is further configured to determine a start time and an end time of each of the one or more converted interrupt request signals using the start frame and the end frame of a corresponding one of the one or more interrupt reference level signals.

5. The conversion system of claim 4, wherein the interrupt request signal converter includes:
a plurality of sub-converters configured to generate the plurality of intermediate signals, respectively, and each including:
a first input terminal configured to be coupled to one of the plurality of interrupt request signal input terminals; and
a second input terminal configured to be coupled to an interrupt reference level signal input terminal; and
a logical AND operator configured to generate the one converted interrupt request signal corresponding to the first interrupt reference level signal by performing a logical AND operation on the plurality of intermediate signals.

6. The conversion system of claim 5, wherein:
each of the plurality of sub-converters further includes a counter; and
a j-th sub-converter of the plurality of sub-converters is configured to, in response to receiving a k-th peripheral interrupt request signal of the N peripheral interrupt request signals from a j-th interrupt request signal input terminal of the plurality of interrupt request signal input terminals, and detecting the start frame of the first interrupt reference level signal:
cause the counter of the j-th sub-converter to start counting; and
set the interrupt identification bit of the intermediate signal output by the j-th sub-converter to the first level in response to a value of the counter of the j-th sub-converter equaling a device identification value matching the peripheral device sending the k-th peripheral interrupt request signal, k being a positive integer smaller than or equal to N, and j being a positive integer smaller than or equal to a number of the plurality of sub-converters.

7. The conversion system of claim 5, wherein:
the interrupt request signal converter includes a counter; and
the interrupt request signal converter is further configured to:
in response to, when a k-th peripheral interrupt request signal of the N peripheral interrupt request signals is received, the counter being reset and being not in a counting state, or the counter being in the counting state but missing a k-th device identification value that matches the peripheral device sending the k-th peripheral interrupt request signal:
generate one converted interrupt request signal of the one or more converted interrupt request signals that corresponds to the k-th peripheral interrupt request signal within one or more clock cycles occupied by the blank frame of a first interrupt reference level signal among the one or more interrupt reference level signals that is first received after the k-th peripheral interrupt request signal is received; and
in response to, when the k-th peripheral interrupt request signal is received, the counter being in the counting state and the k-th device identification value being not missed:
form the one converted interrupt request signal corresponding to the k-th peripheral interrupt request signal within one or more clock cycles occupied by the blank frame of a currently received interrupt reference level signal.

8. The conversion system of claim 7, wherein the interrupt request signal converter is further configured to:
in response to, when the k-th peripheral interrupt request signal is received, the counter being reset and being not in the counting state:
cause the counter to be in the counting state after detecting the start frame of the first interrupt reference level signal; and
generate one interrupt request identifier of the N interrupt request identifiers that corresponds to the k-th peripheral interrupt request signal in response to a value of the counter equaling the k-th device identification value,
in response to, when the k-th peripheral interrupt request signal is received, the counter being in the counting state but missing the k-th device identification value:

cause the counter to be in a recounting state after detecting the start frame of the first interrupt reference level signal; and generate the one interrupt request identifier corresponding to the k-th peripheral interrupt request signal in response to a recounted value of the counter equaling the k-th device identification value; and in response to, when the k-th peripheral interrupt request signal is received, the counter being in the counting state and the k-th device identification value being not missed:

generate the one interrupt request identifier corresponding the k-th peripheral interrupt request signal in response to the value of the counter equaling the k-th device identification value.

9. The conversion system of claim 3, wherein each of the one or more converted interrupt request signals includes:
a start frame;
an end frame located after the start frame in terms of time; and
a data frame located between the start frame and the end frame in terms of time, and including the plurality of interrupt identification bits of the converted interrupt request signal.

10. The conversion system of claim 9, wherein:
the interrupt request signal converter includes a counter; and
the interrupt request signal converter is further configured to:
in response to, when a k-th peripheral interrupt request signal of the N peripheral interrupt request signals is received, the counter being reset and being not in a counting state, cause the counter to start counting.

11. The conversion system of claim 10, wherein the interrupt request signal converter is further configured to:
in response to a value of the counter being between a reset value of the counter and a first value, generate the start frame of one converted interrupt request signal of the one or more converted interrupt request signals that corresponds to the k-th peripheral interrupt request signal;
in response to the value of the counter being equal to a k-th device identification value, generate an interrupt request identifier corresponding to the one converted interrupt request signal corresponding to the k-th peripheral interrupt request signal, the k-th device identification value matching the peripheral device sending the k-th peripheral interrupt request signal; and
in response to the value of the counter being between a second value and a third value, generate the end frame of the one converted interrupt request signal corresponding to the k-th peripheral interrupt request signal, the reset value of the counter, the first value, the device identification value, the second value, and the third value being non-negative integers and changing monotonously.

12. The conversion system of claim 11, wherein the interrupt request signal converter is further configured to:
in response to the counter being in the counting state when the k-th peripheral interrupt request signal is received, cause the counter to reset and start recounting after the value of the counter reaches a preset boundary value, the second value, the third value, and the preset boundary value changing monotonously; and
in response to a recounted value of the counter being between the reset value of the counter and the first value, equaling the k-th device identification value, and being between the second value and the third value, generate the start frame, the interrupt request identifier, and the end frame of the one converted interrupt request signal corresponding to the k-th peripheral interrupt request signal, respectively.

13. The conversion system of claim 11, wherein the interrupt request signal converter is further configured to:
in response to the counter being in the counting state and the k-th device identification value being not missed when the k-th peripheral interrupt request signal is received, generate the interrupt request identifier of the one converted interrupt request signal corresponding to the k-th peripheral interrupt request signal in response to the value of the counter equaling the k-th device identification value; and
in response to the counter being in the counting state and the k-th being missed when the k-th peripheral interrupt request signal is received, generate the start frame, the interrupt request identifier, and the end frame of the one converted interrupt request signal corresponding to the k-th peripheral interrupt request signal in response to the recounted value of the counter being between the reset value of the counter and the first value, equaling the k-th device identification value, and being between the second value and the third value, respectively.

14. The conversion system of claim 11, wherein:
the reset value of the counter, the first value, the device identification value, the second value, and the third value sequentially increase.

15. A computing device comprising:
a processor including an interface module and an interrupt controller; and
an interrupt request signal conversion system including:
an interrupt request signal converter configured to generate one or more converted interrupt request signals based on one or more signals received from a plurality of peripheral devices, each of the one or more converted interrupt request signals including a plurality of interrupt identification bits each used to identify, based on a first level and a second level different from the first level, whether a signal received from a corresponding one of the one or more peripheral devices within a predetermined time range includes a peripheral interrupt request signal;
a plurality of interrupt request signal input terminals configured to be coupled to the plurality of peripheral devices, respectively; and
a signal output terminal configured to send the one or more converted interrupt request signals to the interface module of the processor during operation;
wherein:
the interface module includes an interface controller configured to report an interrupt request of the peripheral device requesting interrupt to the interrupt controller based on the one or more converted interrupt request signals;
the interrupt request signal converter is further configured to receive one or more interrupt reference level signals corresponding to the one or more converted interrupt request signals from the interface module;
wherein each of the one or more interrupt reference level signals includes including a start frame, an end frame, and a blank frame located between the start frame and the end frame;
in response to the signals received from the plurality of peripheral devices including N peripheral interrupt request signals, N being a positive integer, the interrupt request signal converter is further configured to:
receive the N peripheral interrupt request signals from the plurality of interrupt request signal input terminals within one or more clock cycles occupied by a same one of the one or more interrupt reference level signals;
generate, based on the N peripheral interrupt request signals, a plurality of intermediate signals within one or more clock cycles occupied by the blank frame of a first interrupt reference level signal among the one or more interrupt reference level signals that is first received after the N peripheral interrupt request signals are received; and
perform a logical AND operation on the plurality of intermediate signals to generate one converted interrupt request signal of the one or more converted interrupt request signals that corresponds to the first interrupt reference level signal;
each of the intermediate signals includes an interrupt identification bit corresponding to the interrupt request signal input terminal coupled to a sub-converter that outputs each of the intermediate signals;
the plurality of interrupt request signal input terminals are configured to receive the N peripheral interrupt request signals; and
the peripheral interrupt request signal corresponding to the first interrupt reference level signal includes the N interrupt request identifiers.

16. The computing device of claim 15, wherein:
the interface module is configured to send one or more interrupt reference level signals to the interrupt request signal conversion system;
each of the one or more interrupt reference level signals includes a start frame and an end frame; and
the interface controller is further configured to:
set an end of the start frame of the interrupt reference level signal corresponding to one converted interrupt request signal of the one or more converted interrupt request signals as a start time of the one converted interrupt request signal; and
determine the peripheral device requesting interrupt identified by the interrupt identification bit of the first level based on a number of clock cycles between the interrupt identification bit at the first level in the one or more converted interrupt request signals and the start time.

17. The computing device of claim 16, wherein:
the interface module is configured to report interrupt requests of all peripheral devices requesting interrupt identified by the one or more converted interrupt request signals after sending the end frame to the interrupt request signal conversion system.

18. The computing device of claim 15, wherein:
each of the one or more converted interrupt request signals includes a start frame and an end frame; and
the interface controller is further configured to determine the peripheral device requesting interrupt identified by the interrupt identification bit of the first level based on a number of clock cycles between the interrupt identification bit at the first level and the start frame in each of the one or more converted interrupt request signals.

19. An interrupt request signal conversion method comprising:
generating, by an interrupt request signal converter, one or more converted interrupt request signals based on one or more signals received from a plurality of peripheral devices, a plurality of interrupt request signal input terminals being configured to be coupled to the plurality of peripheral devices, respectively; and
sending, by a signal output terminal, the one or more converted interrupt request signals to an interface module of a processor during operation;
wherein:
each of the converted interrupt request signals includes a plurality of interrupt identification bits, each of the one or more converted interrupt request signals including a plurality of interrupt identification bits each used to identify, based on a first level and a second level different from the first level, whether a signal received from a corresponding one of the one or more peripheral devices within a predetermined time range includes a peripheral interrupt request signal;
the interrupt request signal converter is further configured to receive one or more interrupt reference level signals corresponding to the one or more converted interrupt request signals from the interface module; wherein each of the one or more interrupt reference level signals includes including a start frame, an end frame, and a blank frame located between the start frame and the end frame;
in response to the signals received from the plurality of peripheral devices including N peripheral interrupt request signals, N being a positive integer, the interrupt request signal converter is further configured to:
receive the N peripheral interrupt request signals from the plurality of interrupt request signal input terminals within one or more clock cycles occupied by a same one of the one or more interrupt reference level signals;
generate, based on the N peripheral interrupt request signals, a plurality of intermediate signals within one or more clock cycles occupied by the blank frame of a first interrupt reference level signal among the one or more interrupt reference level signals that is first received after the N peripheral interrupt request signals are received; and
perform a logical AND operation on the plurality of intermediate signals to generate one converted interrupt request signal of the one or more converted interrupt request signals that corresponds to the first interrupt reference level signal;
each of the intermediate signals includes an interrupt identification bit corresponding to the interrupt request signal input terminal coupled to a sub-converter that outputs each of the intermediate signals;
the plurality of interrupt request signal input terminals are configured to receive the N peripheral interrupt request signals; and
the peripheral interrupt request signal corresponding to the first interrupt reference level signal includes the N interrupt request identifiers.

* * * * *